United States Patent
Huang

(10) Patent No.: US 11,772,818 B1
(45) Date of Patent: Oct. 3, 2023

(54) UNMANNED, RAPID AND CIRCULAR TRANSPORTATION SYSTEM FOR AIRPORT PASSENGERS AND LUGGAGE

(71) Applicant: Caixiong Huang, Nanning (CN)

(72) Inventor: Caixiong Huang, Nanning (CN)

(*) Notice: Subject to any disclaimer, the term of this patent is extended or adjusted under 35 U.S.C. 154(b) by 0 days.

(21) Appl. No.: 18/331,146

(22) Filed: Jun. 7, 2023

Related U.S. Application Data

(63) Continuation of application No. PCT/CN2021/137136, filed on Dec. 10, 2021.

(51) Int. Cl.
| | |
|---|---|
| *B64F 1/36* | (2017.01) |
| *B64F 1/31* | (2006.01) |
| *B66F 7/14* | (2006.01) |
| *B61D 13/00* | (2006.01) |
| *B61B 1/02* | (2006.01) |

(52) U.S. Cl.
CPC ............ *B64F 1/31* (2013.01); *B61B 1/02* (2013.01); *B61D 13/00* (2013.01); *B66F 7/14* (2013.01)

(58) Field of Classification Search
CPC ...... B64F 1/30; B64F 1/31; B64F 1/32; B64F 1/36; B64F 1/368; B61B 1/02; B61D 13/00; B61D 13/02; B66F 7/14
See application file for complete search history.

(56) References Cited

U.S. PATENT DOCUMENTS

| | | | | |
|---|---|---|---|---|
| 4,416,435 | A * | 11/1983 | Szendrodi | B64F 1/368 244/114 R |
| 7,599,847 | B2 | 10/2009 | Block et al. | |
| 10,800,608 | B1 * | 10/2020 | Campbell | G06Q 10/08 |
| 10,810,518 | B2 | 10/2020 | Block et al. | |
| 2020/0223526 | A1 * | 7/2020 | Prendergast | B64F 1/30 |
| 2020/0258017 | A1 * | 8/2020 | Rajaguru | G06Q 10/0631 |

FOREIGN PATENT DOCUMENTS

| | | |
|---|---|---|
| CN | 102383370 A | 3/2012 |
| CN | 103942867 A | 7/2014 |
| CN | 204934042 U | 1/2016 |
| CN | 109703432 A | 5/2019 |
| CN | 109850179 A | 6/2019 |

(Continued)

*Primary Examiner* — Robert J McCarry, Jr.
(74) *Attorney, Agent, or Firm* — True Shepherd LLC; Andrew C. Cheng

(57) ABSTRACT

An unmanned, rapid and circular transportation system for airport passengers and luggage mainly includes an unmanned, rapid and vertical circular transportation system for passengers, an unmanned, rapid and full-plane or local-interchange circular transportation system for passengers' luggage, and a control system therefor. The whole system comprises an oval-shaped central area for passengers to consign and pick up luggage and a plurality of corridors which are arranged radially with the center of the oval shape as an origin. Passenger plane gate positions are arranged on two sides of the corridors. The unmanned, rapid and vertical circular transportation system for passengers is arranged at a second floor of the corridors, and the unmanned, rapid and full-plane or local-interchange circular transportation system for passengers' luggage is arranged in the central area and at a first floor of the corridors, and is substantially level with an external passenger plane docking deck.

8 Claims, 28 Drawing Sheets

(56) References Cited

FOREIGN PATENT DOCUMENTS

| | | |
|---|---|---|
| CN | 110758406 A | 2/2020 |
| CN | 110789536 A | 2/2020 |
| CN | 110821237 A | 2/2020 |
| CN | 112758344 A | 5/2021 |
| JP | 2000135980 A | 5/2000 |
| WO | 2005096770 A2 | 10/2005 |

* cited by examiner

UNMANNED, RAPID AND CIRCULAR TRANSPORTATION SYSTEM FOR AIRPORT PASSENGERS AND LUGGAGE

CROSS-REFERENCE TO RELATED APPLICATIONS

This application is a continuation of International Patent Application No. PCT/CN2021/137136 with a filing date of Dec. 10, 2021, designating the United States, now pending, and further claims priority to Chinese Patent Application No. 202011645565.7 with a filing date of Dec. 28, 2020. The content of the aforementioned applications, including any intervening amendments thereto, are incorporated herein by reference.

TECHNICAL FIELD

The present disclosure relates to the technical field of transportation systems for airport passengers and luggage, and in particular, to an unmanned, rapid and circular transportation system for airport passengers and luggage.

BACKGROUND

With the rapid development of the global aviation industry, airports have been or are going to be set up in regions (districts) and counties of many countries, flights will become increasingly busy. Due to lack of docking positions for flights, passengers and luggage of many flights are ferried by ground transportation vehicles. Ferry vehicle cannot travel in a straight line and need to keep away from running routes of passenger planes and other vehicles. This is thus unsafe, not environmental-friendly, inefficient and uneconomical. In order to adapt to the rapid development of the aviation industry, there is an urgent need for a better solution to solve the above problems.

SUMMARY OF PRESENT INVENTION

To address the above-mentioned situations, the present disclosure provides an unmanned, rapid and circular transportation system solution for passengers and luggage that is short in route, rapid, safe and efficient and occupies minimal public road surface. The unmanned, rapid and circular transportation system for airport passengers and luggage mainly includes an unmanned, rapid and vertical circular transportation system for passengers, an unmanned, rapid and full-plane or local-interchange circular transportation system for passengers' luggage, and a control system therefor. The whole system includes an oval-shaped central area for passengers to consign and pick up luggage and a plurality of corridors which are arranged radially with the center of the oval shape as an origin. Passenger plane gate positions are arranged on two sides of the corridors. The unmanned, rapid and vertical circular transportation system for passengers is arranged at a second floor of the corridors, and the unmanned, rapid and full-plane or local-interchange circular transportation system for passengers' luggage is arranged in the central area and at a first floor of the corridors, and is substantially level with an external passenger plane docking floor.

To achieve the above objective, the present disclosure provides the following solutions:

The unmanned, rapid and vertical circular transportation system for passengers mainly includes a rail system mounted fixedly, an overall rail facility lifting system mounted at a head and an tail, a passenger transportation trolley, an overhaul and maintenance system fixedly mounted at the tail, and supporting auxiliary systems such as a steel column, an automatic door, a waiting platform, a safety fence and a lounge bridge system, and a transfer trolley for the passenger transportation trolley between corridors, etc.

The rail system includes upper and lower rails mounted fixedly for the passenger transportation trolley to travel thereon, and trolley conductors for the passenger transportation trolley to acquire power. The upper rail and a rail beam are supported by a steel column. The trolley conductors are arranged outside the rails. The upper trolley conductor is fixed to the rail beam by means of an insulator support, while the lower trolley conductor is concealed to prevent poor contact or short circuit due to being walked upon by the maintenance personnel and falling of dust and foreign matter. All stops have respective automatic doors and upper waiting platforms, and the ground along the entire route is enclosed totally with a safety fence. All stops have respective position sensors and video surveillance devices, and each position sensor is fixed to the rail beam by means of a support thereof.

The overall rail facility lifting system is mainly comprising a vertical synchronous lifting mechanism, an overall rail facility (on which the arrangements of the rails and the trolley conductors are consistent with those of the rail system), and a cable drag chain. The vertical synchronous lifting mechanism allows the overall rail facility to rise and fall vertically and synchronously. The vertical synchronous lifting mechanism has a lower fixed support position and an upper retractable support position. The upper and lower support positions guarantee that the overall rail facility lifting system is accurately aligned with the rail system. A cable in the cable drag chain allows the trolley conductors and the position sensors in the overall rail facility to always keep connection with a power supply and control system.

The passenger transportation trolley is mainly comprising a power driving system, a collector clip, a position sensor board, an electronic control system, a wireless communication module system, etc.

The overhaul, maintenance and surplus vehicle parking system is aligned with the rail system. When a passenger transportation trolley is out of order or the system does not need so many passenger transportation trolleys, the passenger transportation trolley(s) may enter the overhaul and maintenance system. After entering the overhaul and maintenance system, the passenger transportation trolley does not affect the normal circular operation of the transportation system, and overhaul positions may be increased or decreased easily.

The supporting auxiliary systems such as the steel column, the automatic door, the waiting platform, the safety fence and the lounge bridge system guarantee the safety, accuracy and convenience for passengers.

The transfer trolley for the passenger transportation trolley between corridors allows the passenger transportation trolley to be shared between the corridors.

The unmanned, rapid and full-plane or local-interchange circular transportation system for passengers' luggage includes two identical independent and associated mirror freight transportation systems, each of which mainly includes a passenger's luggage registration system, a passenger's luggage pick-up system, a full-plane or local-interchange luggage transportation rail system with numerous rail switching spurs, a passenger plane-side luggage loading and unloading system, and a powered vehicle group for luggage transportation comprising a plurality of self-powered luggage transportation vehicles, and a luggage transportation vehicle overhauling system.

The passenger's luggage registration system includes a belt weigher, a horizontal conveying belt and a registration side branch rail. The registration side branch rail is arranged perpendicularly to a major circular rail of the luggage transportation rail system so that more passenger's luggage registration stations can be provided, and the powered vehicle group for luggage transportation stopping at the registration side branch rail does not affect the circulation of a main circular passage of the transportation system.

The passenger's luggage pick-up system includes a circular plate-type conveying belt with an information prompting screen displaying prompt information about flight numbers and departures and destinations thereof, and an indoor unloading platform and a pick-up side branch rail. The pick-up side branch rail is arranged in parallel to the major circular rail of the luggage transportation rail system, thereby facilitating unloading. Although it is impossible to provide more circular plate-type conveying belts, arriving luggage from different flights may share one circular plate-type conveying belt as long as corresponding prompt information about flight numbers and departures and destinations thereof is displayed on an information prompting board. The powered vehicle group for luggage transportation stopping at the pick-up side branch rail does not affect the circulation of the main circular passage of the transportation system.

The luggage transportation rail system includes a circular rail for the powered vehicle group to travel thereon, a spur and a control device therefor, a function terminal branch rail, a position sensor and a surveillance camera system. Since the passenger's luggage transportation system operates in a point-to-point one-off transportation way at a much lower frequency than passenger transportation, the full-plane transportation system is preferred, which has high reliability. The traffic bottleneck of the system lies in the spur system at one floor of the corridor. In case of bad traffic, an interchange may be built at the spur of the corridor part. The whole circular rail is substantially level with the ground (except for the interchange part), which does not affect the traveling of wheeled vehicles.

The passenger plane-side luggage loading and unloading system includes a luggage loading and unloading truck with a liftable conveying belt, and a passenger plane-side branch rail. The passenger plane-side branch rail is arranged perpendicularly to the major circular rail of the luggage transportation rail system, and the powered vehicle group for luggage transportation stopping at the passenger plane-side branch rail does not affect the circulation of the main circular passage of the transportation system.

The powered vehicle group system for luggage transportation includes a plurality of luggage transportation vehicles each having a rechargeable battery pack, a driving device, a position sensor board, an electronic control system, a wireless communication module system, etc.

The luggage transportation vehicle overhauling system serves for replacing the rechargeable battery pack of the luggage transportation vehicle, overhauling and maintaining the luggage transportation vehicle, and allowing surplus luggage transportation vehicles to park. After the powered vehicle group for luggage transportation enters the overhaul system, the normal circular operation of the whole road network system is not affected.

The unmanned, rapid and vertical circular transportation system for passengers and the unmanned, rapid and plane or local-interchange circular transportation system for passengers' luggage are uniformly controlled by a real-time sensing display system comprising sensors and surveillance cameras that are distributed throughout the whole rail system, a holographic real-time simulation animation control system, and a distributed control system (DCS) comprising a system with a function of automatically grouping all rail network spurs. The control system must receive a feedback signal acknowledgment before performing next step of a program. If there is no feedback signal acknowledgment signal, the system stops performing the program and generates corresponding fault code, which is convenient for the maintenance personnel to carry out rapid trouble clearing and recover the operation of the system.

Compared with the prior art, the present disclosure has the following beneficial technical effects:

The present disclosure provides an unmanned, rapid and circular transportation system for passengers and luggage that enables passengers and luggage to arrive at destinations more rapidly and safely. Detailed description is made in the following aspects:

(1) Passengers and luggage may rapidly arrive at destinations with one stop, and valuable time is saved.
(2) A safety wheel is disposed at the bottom of the passenger transportation trolley to ensure safe traveling.
(3) The luggage transportation rail system adopts a full-automatic grouping technique, ensuring safe and reliable operation.
(4) Since the way of circulation is adopted, the transportation cost is reduced.
(5) Manned ground ferry vehicles are canceled such that the transportation cost is reduced.
(6) If the particularity of passenger's luggage is not considered, for general freight, unmanned registration and pick-up of the freight can be realized easily.

BRIEF DESCRIPTION OF THE DRAWINGS

To describe the technical solutions in embodiments of the present disclosure or in the prior art more clearly, the accompanying drawings required in the embodiments will be briefly described below. Apparently, the accompanying drawings in the following description show merely some embodiments of the present disclosure, and other drawings can be derived from these accompanying drawings by those of ordinary skill in the art without creative efforts.

Figure 1:
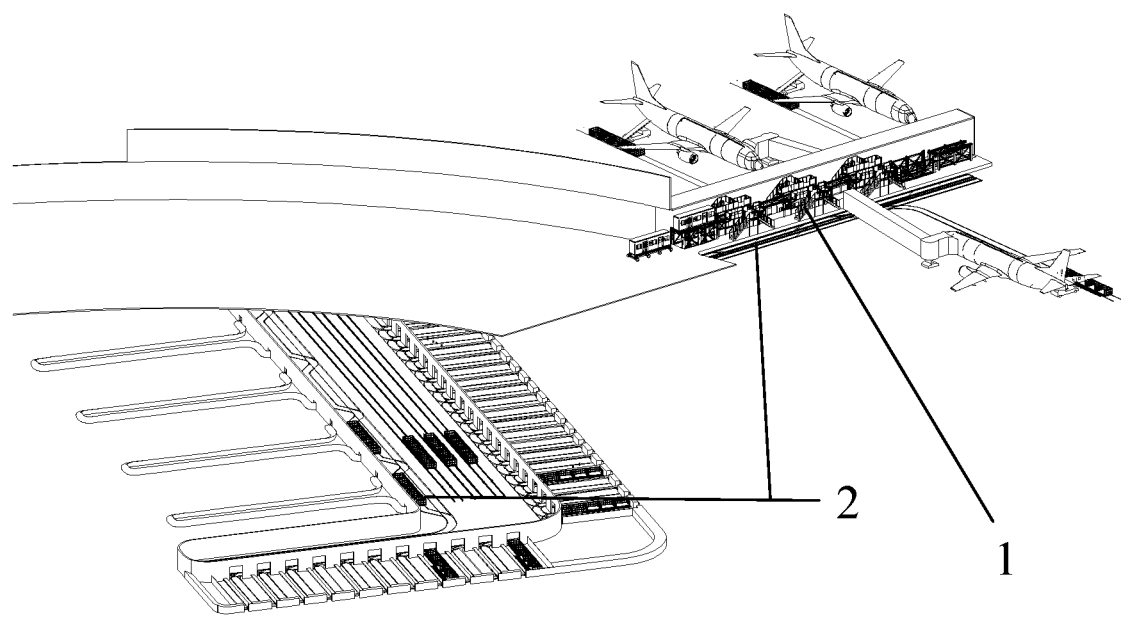
FIG. 1 is a partial schematic diagram of an unmanned, rapid and circular transportation system for airport passengers and luggage.

List of Reference Numerals: 1—unmanned, rapid and vertical circular transportation system for passengers; 2—unmanned, rapid and full-plane or local-interchange circular transportation system for passengers and luggage;
- 11—double-deck passenger transportation rail system; 111—steel column; 112—automatic door; 113—safety fence; 114—waiting platform; 115—rail; 116—rail beam; 117—insulator support; 118—trolley conductor;
- 12—overall rail facility lifting system; 121—cable drag chain; 122—overall rail facility; 123—removable stopper; 124—overall rail facility bottom palm; 125—ring-shaped longitudinal slider; 126—longitudinal guiding sliding sleeve; 127—position sensor; 128—transmission shaft; 129—driving motor; 1210—commutator; 1211—electric push rod; 1212—internally threaded elevating sleeve; 1213—upper movable support frame; 1214—elevating screw; 1215—steel column; 1216—vertical guide groove; 1217—lower fixed support frame; 1218—lead screw elevator; 1219—palm of movable support frame;
- 13—overall rail facility lifting system without removable stopper;
- 14—passenger transportation trolley; 141—driving traveling wheel; 142—bearing seat; 143—coupling; 144—speed reducer; 145—driving motor; 146—safety stopper; 147—chassis girder; 148—safety wheel; 149—position sensor board; 1410—insulating column; 1411—conductor; 1412—collector clip;
- 15—parking system for overhaul, maintenance and surplus vehicles;
- 16—corridor;
- 17—lounge bridge;
- 18—transfer trolley for the passenger transportation trolley between corridors;
- 21—passenger's luggage registration system; 211—belt weigher; 212—horizontal conveying belt; 231—registration side branch rail;
- 22—passenger's luggage pick-up system; 221—circular plate-type conveying belt; 232—pick-up side branch rail;
- 23—luggage transportation rail system; 231—registration side branch rail; 232—pick-up side branch rail; 233—annular connecting rail; 234—passenger plane-side branch rail;
- 24—passenger plane-side luggage loading and unloading system; 241—luggage loading and unloading truck; 234—passenger plane-side branch rail;
- 25—powered vehicle group for luggage transportation; and
- 26—system for vehicle overhaul, maintenance, rechargeable battery pack replacement and surplus vehicle parking.

DETAILED DESCRIPTION OF THE EMBODIMENTS

The technical solutions in the embodiments of the present disclosure will be clearly and completely described below with reference to the accompanying drawings. Apparently, the described embodiments are merely a part rather than all of the embodiments of the present disclosure. All other embodiments derived from the embodiments of the present disclosure by a person of ordinary skill in the art without creative efforts shall fall within the protection scope of the present disclosure.

An objective of the present disclosure is to provide an unmanned, rapid and circular transportation system for airport passengers and luggage to solve the problems existing in the prior art.

To make the above objective, features, and advantages of the present disclosure clearer and more comprehensible, the present disclosure will be further described in detail below with reference to the accompanying drawings and the specific embodiments.

According to a specific embodiment of the present disclosure, an unmanned, rapid and vertical circular transportation system for passengers is provided, as shown in FIG. 1 to FIG. 28, including an unmanned, rapid and vertical circular transportation system 1 for passengers, an unmanned, rapid and full-plane or local-interchange circular transportation system 2 for passengers' luggage and a control system therefor.

Specifically, the unmanned, rapid and vertical circular transportation system 1 for passengers includes a double-deck passenger transportation rail system 11, an overall rail facility lifting system 12, a passenger transportation trolley 14, and a parking system 15 for overhaul, maintenance and surplus vehicles.

The double-deck passenger transportation rail system 11 is disposed at a second floor of a corridor and includes upper and lower rails 115 mounted fixedly for the passenger transportation trolley 14 to travel thereon, and upper and lower trolley conductors 118 for the passenger transportation trolley to acquire power. The upper rail 115 and a rail beam 116 are supported by a steel column 111. The trolley conductors 118 are arranged outside the rails. The upper trolley conductor 118 is fixed to the rail beam 116 by means of an insulator support 117, while the lower trolley conductor 118 is concealed. All stops have respective automatic doors 112 and upper waiting platforms 114, and the ground along the entire route is enclosed totally with a safety fence 113. All stops have respective position sensors and video surveillance devices, and each position sensor 127 is fixed to the rail beam by means of a support thereof.

The overall rail facility lifting system 12 includes: an overall rail facility 122 which includes a rail and a trolley conductor, a removable stopper 123, an overall rail facility bottom palm 124, a ring-shaped longitudinal slider 125, a longitudinal guiding sliding sleeve 126 and a position sensor 127, and which has rail and trolley conductor arrangements thereon consistent with those of the rail system 11; vertical guide grooves 1216 arranged on a plurality of vertically mounted steel columns 1215 to restrict the overall rail facility 122 only to rise and fall vertically; a driving motor 129, a commutator 1210, a transmission shaft 128, a lead screw elevator 1218, an elevating screw 1214 and an internally threaded elevating sleeve 1212 that cause the overall rail facility 122 to rise and fall; and a lower fixed support frame 1217 and an upper movable support frame 1213 to guarantee that the rail and the trolley conductor on the overall rail facility 122 are accurately aligned with the upper and lower rails and trolley conductors of the double-deck passenger transportation rail system 11 and the upper and lower rails and trolley conductors of the overhaul, maintenance and surplus vehicle parking system. A cable in the cable drag chain 121 allows the trolley conductors and the position sensors in the overall rail facility to always keep connection with a power supply and control system.

The passenger transportation trolley 14 includes a driving system comprising a driving motor 145, a speed reducer 144, a coupling 143 and a bearing seat 142, a safe traveling system comprising a chassis girder 147, a driving traveling wheel 141, a safety wheel 148 and a safety stopper 146, a power acquiring system comprising an insulating column 1410, a conductor 1411 and a collector clip 1412, a position sensor board 149 allowing the control system to sense a position thereof, an electronic control system and a wireless communication module system.

The unmanned, rapid and full-plane or local-interchange circular transportation system 2 for passengers' luggage includes two identical independent and associated mirror freight transportation systems, each of which mainly includes a passenger's luggage registration system 21, a passenger's luggage pick-up system 22, a full-plane or local-interchange luggage transportation rail system 23 with numerous rail switching spurs and a driving device therefor and having position sensors and video surveillance devices disposed at all parking and avoiding points, a passenger plane-side luggage loading and unloading system 24, a powered vehicle group 25 for luggage transportation, and a system 26 for vehicle overhaul, maintenance, rechargeable battery pack replacement and surplus vehicle parking.

In the whole control system, the unmanned, rapid and vertical circular transportation system for passengers and the unmanned, rapid and full-plane or local-interchange circular transportation system for passengers' luggage are uniformly controlled by a real-time sensing display system comprising sensors and surveillance cameras that are distributed throughout the whole rail system, a holographic real-time simulation animation control system, and a DCS comprising a system with a function of automatically grouping all rail network spurs.

In the present specific embodiment, the double-deck passenger transportation rail system 11 includes rails 115, trolley conductors 118, position sensors 127 and rail beams 116, insulator supports 117, steel columns 111, automatic doors 112, safety fences 113 and upper waiting platforms 114 that are in a same arrangement up and down. The trolley conductors 118 are arranged outside the rails 115. The upper trolley conductor 118 is fixed to the rail beam 116 by means of the insulator support 117, while the lower trolley conductor is concealed in the waiting platform. All stops have respective position sensors and video surveillance devices, and each position sensor 127 is fixed to the rail beam by means of the support thereof.

In the present specific embodiment, the overall rail facility lifting system 12 includes: a screw-based synchronous lifting system comprising the driving motor 129, the commutator 1210, the transmission shaft 128, the lead screw elevator 1218, the elevating screw 1214, the internally threaded elevating sleeve 1212, the vertical guide grooves 1216 and the steel columns 1215; the overall rail facility 122 which includes the rails and the trolley conductors arranged consistently with the rail system 11, the removable stopper 123, the overall rail facility bottom palm 124, the ring-shaped longitudinal slider 125, the longitudinal guiding sliding sleeve 126 and the position sensor 127; the upper movable support frame 1213 and the lower fixed support frame 1217 to guarantee that the overall rail facility 122 is accurately level; and the cable drag chain 121 that allows the trolley conductors and the position sensors in the overall rail facility 122 to always keep connection with the power supply and control system.

In the present specific embodiment, the passenger transportation trolley 14 includes the driving system comprising the driving motor 145, the speed reducer 144, the coupling 143 and the bearing seat 142, the safe traveling system comprising the chassis girder 147, the driving traveling wheel 141, the safety wheel 148 and the safety stopper 146, the power acquiring system comprising the insulating column 1410, the conductor 1411 and the collector clip 1412, the position sensor board 149 allowing the control system to sense a position thereof, the electronic control system and the wireless communication module system.

In the present specific embodiment, the passenger's luggage registration system 21 includes a belt weigher 211, a horizontal conveying belt 212 and a registration side branch rail 231. The registration side branch rail 231 is arranged perpendicularly to a major circular rail of the circular transportation system, and the powered vehicle group 25 for luggage transportation stopping at the registration side branch rail does not affect the circulation of a main circular passage of the transportation system.

The passenger's luggage pick-up system 22 includes a circular plate-type conveying belt 221 and a pick-up side branch rail 232. The pick-up side branch rail 232 is arranged in parallel to the major circular rail of the circular transportation system, and the powered vehicle group 25 for luggage transportation stopping at the pick-up side branch rail does not affect the circulation of the main circular passage of the transportation system.

The luggage transportation rail system 23 includes the registration side branch rail 231, the pick-up side branch rail 232, an annular connecting rail 233, a passenger plane-side branch rail 234, a position sensor and a surveillance camera device. The rails of the whole transportation rail system 23 are substantially level with the ground (except for the interchange part), which does not affect the traveling of wheeled vehicles.

The passenger plane-side luggage loading and unloading system 24 includes a luggage loading and unloading truck 241 with a liftable conveying belt, and the passenger plane-side branch rail 234. The passenger plane-side branch rail 234 is arranged perpendicularly to the major circular rail of the circular transportation system, and the powered vehicle group 25 for luggage transportation stopping at the passenger plane-side branch rail does not affect the circulation of the main circular passage of the transportation system.

The powered vehicle group 25 for luggage transportation includes a plurality of self-powered luggage transportation vehicles each having a position sensor board allowing the control system to sense a position thereof, an electronic control system and a wireless communication module system.

In the present specific embodiment, in the control system, the unmanned, rapid and vertical circular transportation system for passengers and the unmanned, rapid and full-plane or local-interchange circular transportation system for passengers' luggage are uniformly controlled by the real-time sensing display system comprising sensors and surveillance cameras that are distributed throughout the whole rail system, the holographic real-time simulation animation control system, and the DCS comprising the system with the function of automatically grouping all rail network spurs. The control system must receive a feedback signal acknowledgment before performing next step of the program. If there is no feedback signal acknowledgment signal, the system stops performing the program and generates corresponding fault code, which is convenient for the maintenance personnel to carry out rapid trouble clearing and recover the operation of the system.

Figure 2:
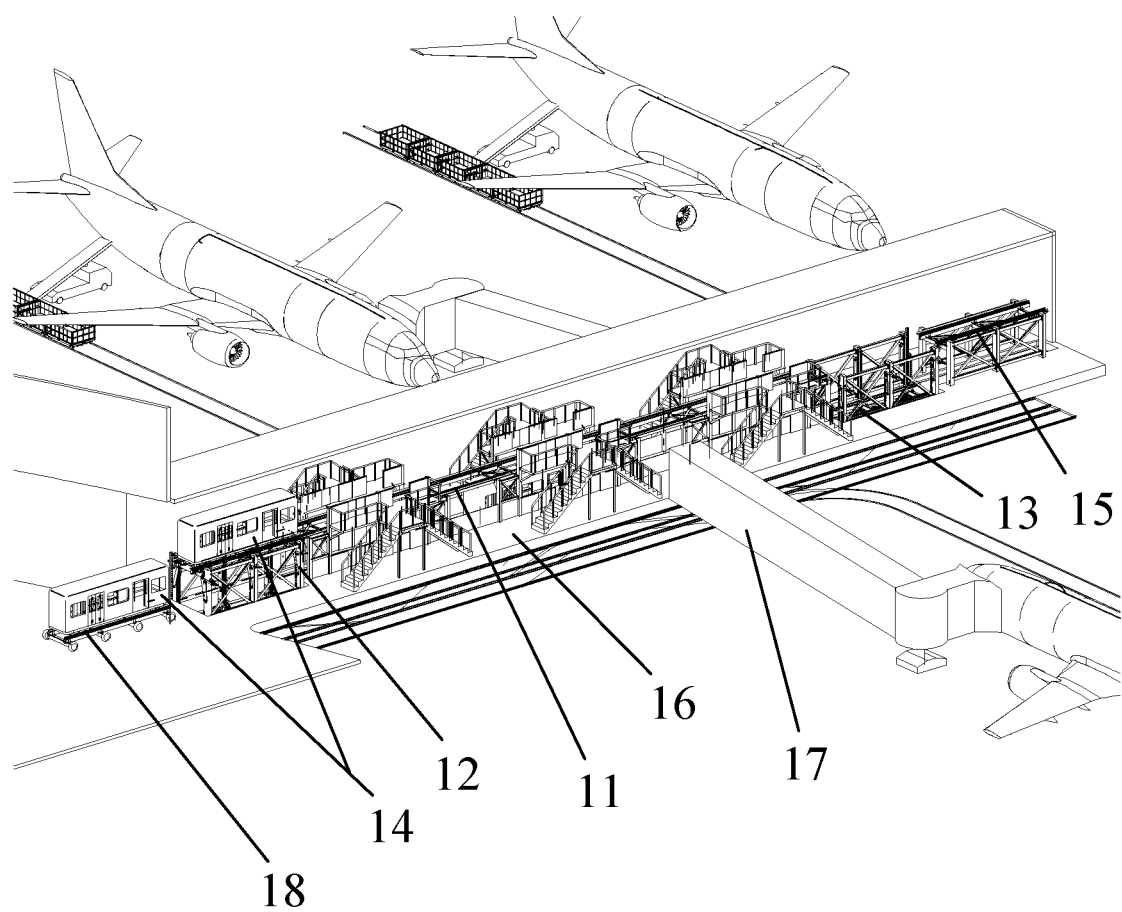
FIG. 2 is a schematic diagram of an unmanned, rapid and vertical circular transportation system for passengers.
Figure 3:
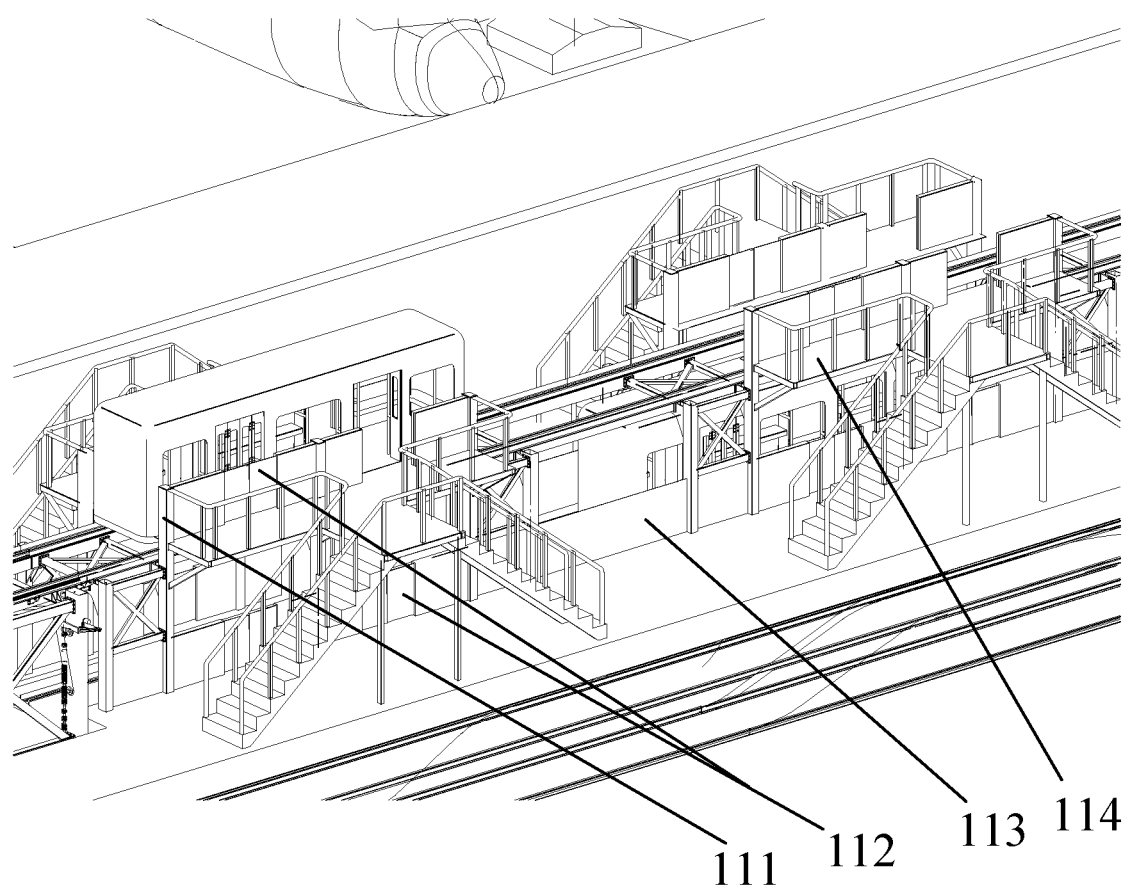
FIG. 3 is a partial schematic diagram of a double-deck rail system in an unmanned, rapid and vertical circular transportation system for passengers.
Figure 4:
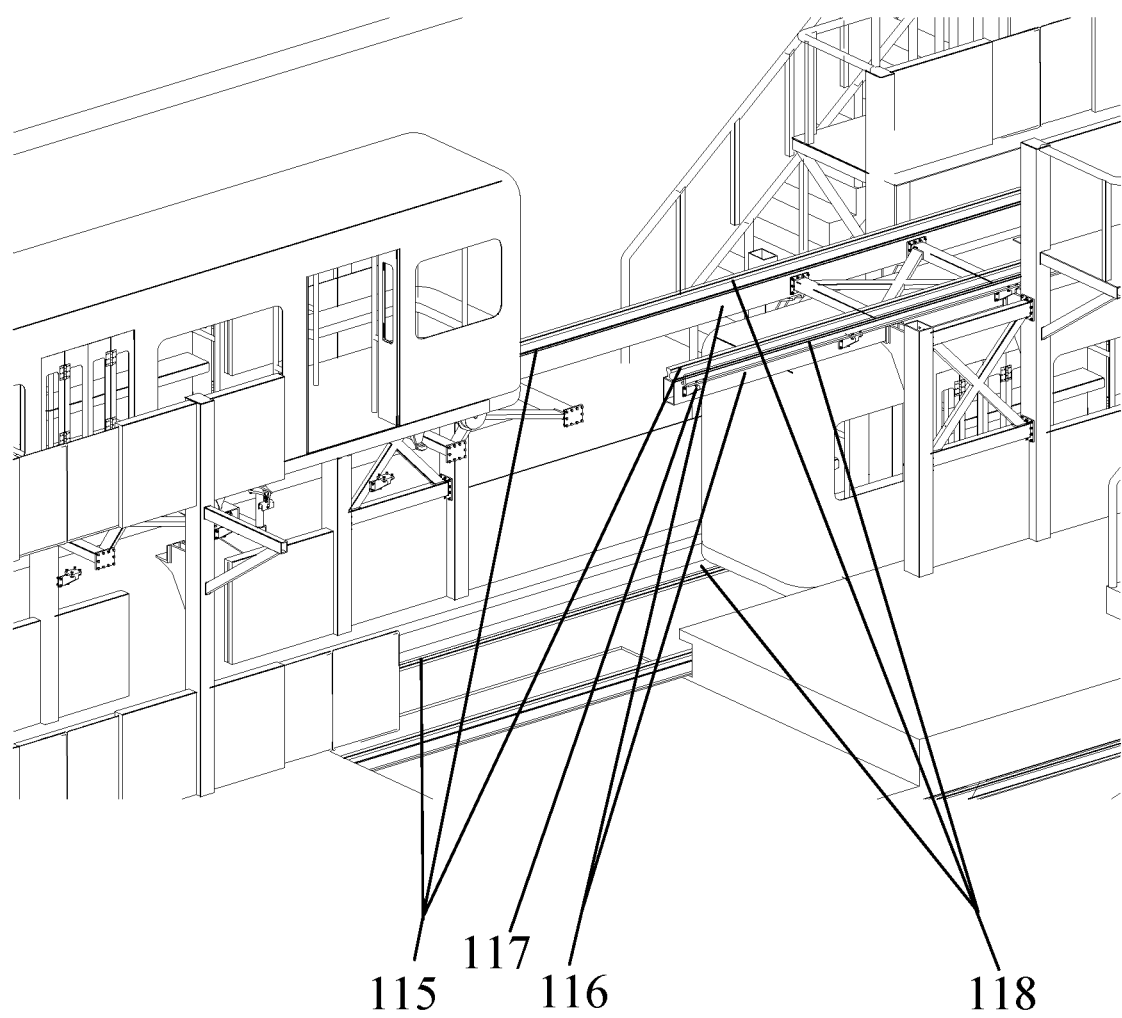
FIG. 4 is a partially enlarged schematic diagram of a rail system.
Figure 5:
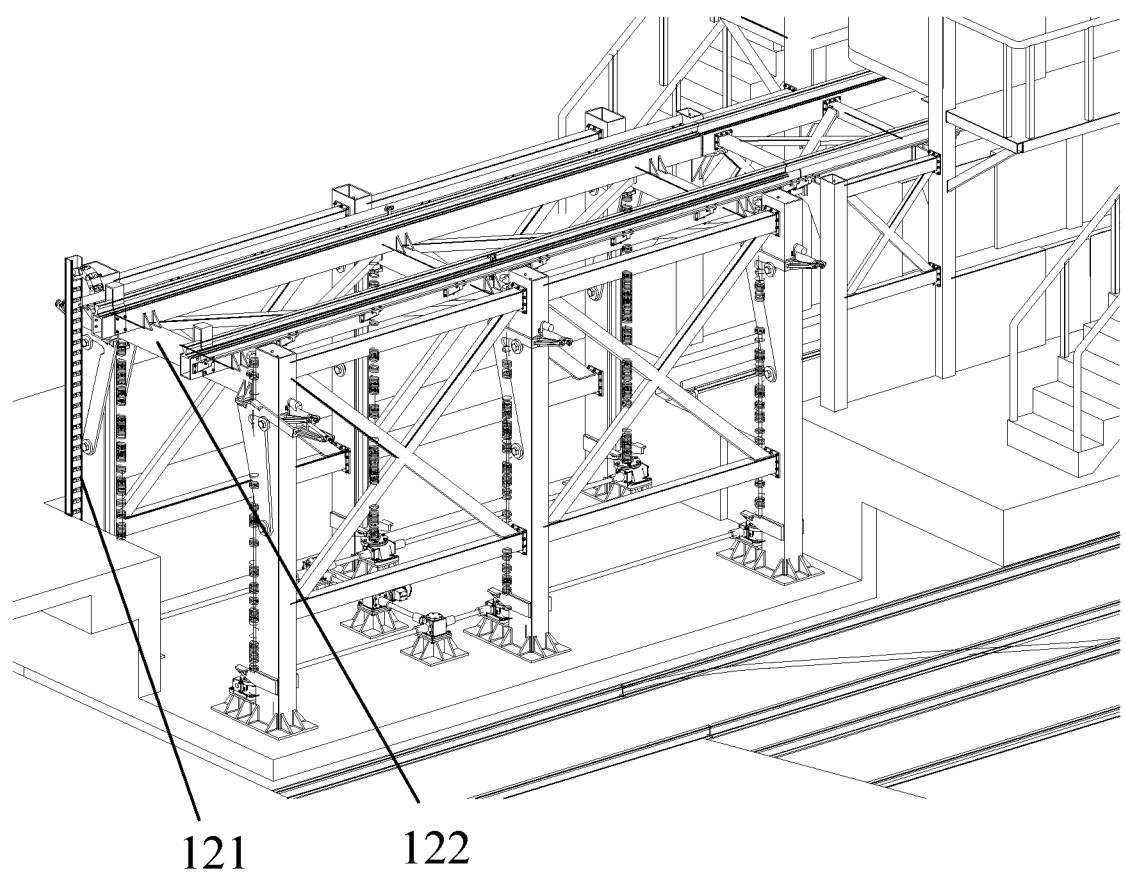
FIG. 5 is a schematic diagram of an overall rail facility lifting system in an unmanned, rapid and vertical circular transportation system for passengers.
Figure 6:
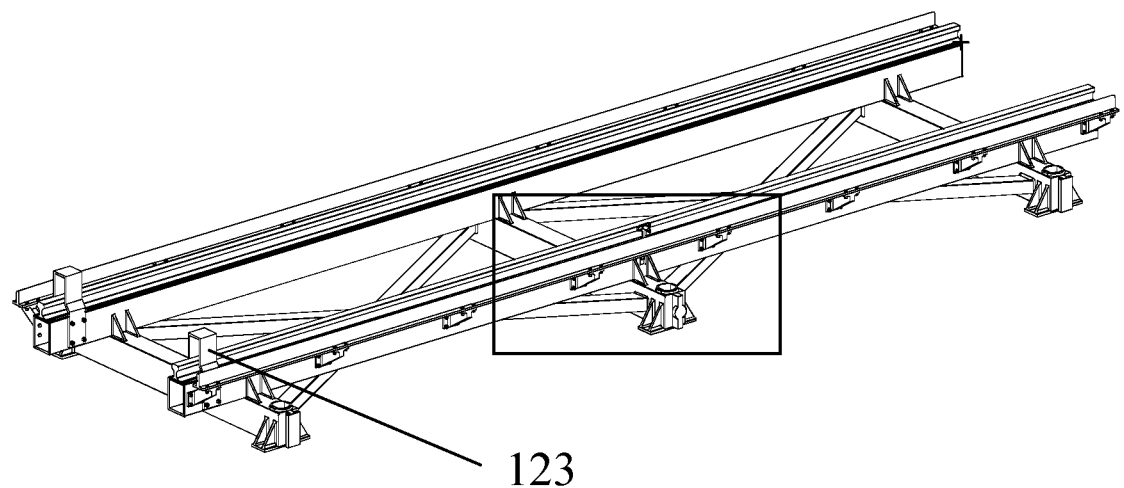
FIG. 6 is a structural schematic diagram of an overall rail facility in a rail facility lifting system.
Figure 7:
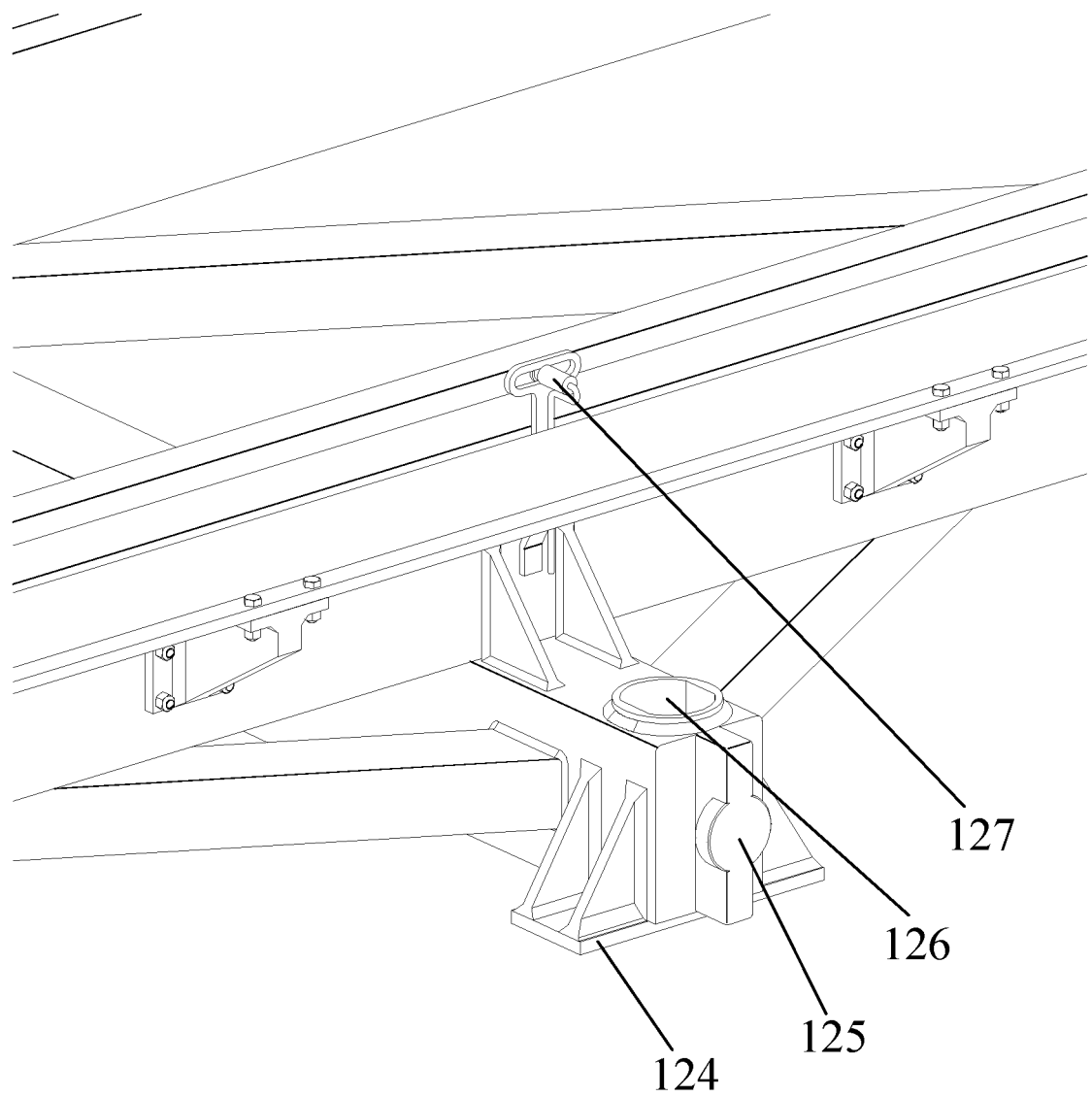
FIG. 7 is a partially enlarged schematic diagram of a structure of an overall rail facility.
Figure 8:
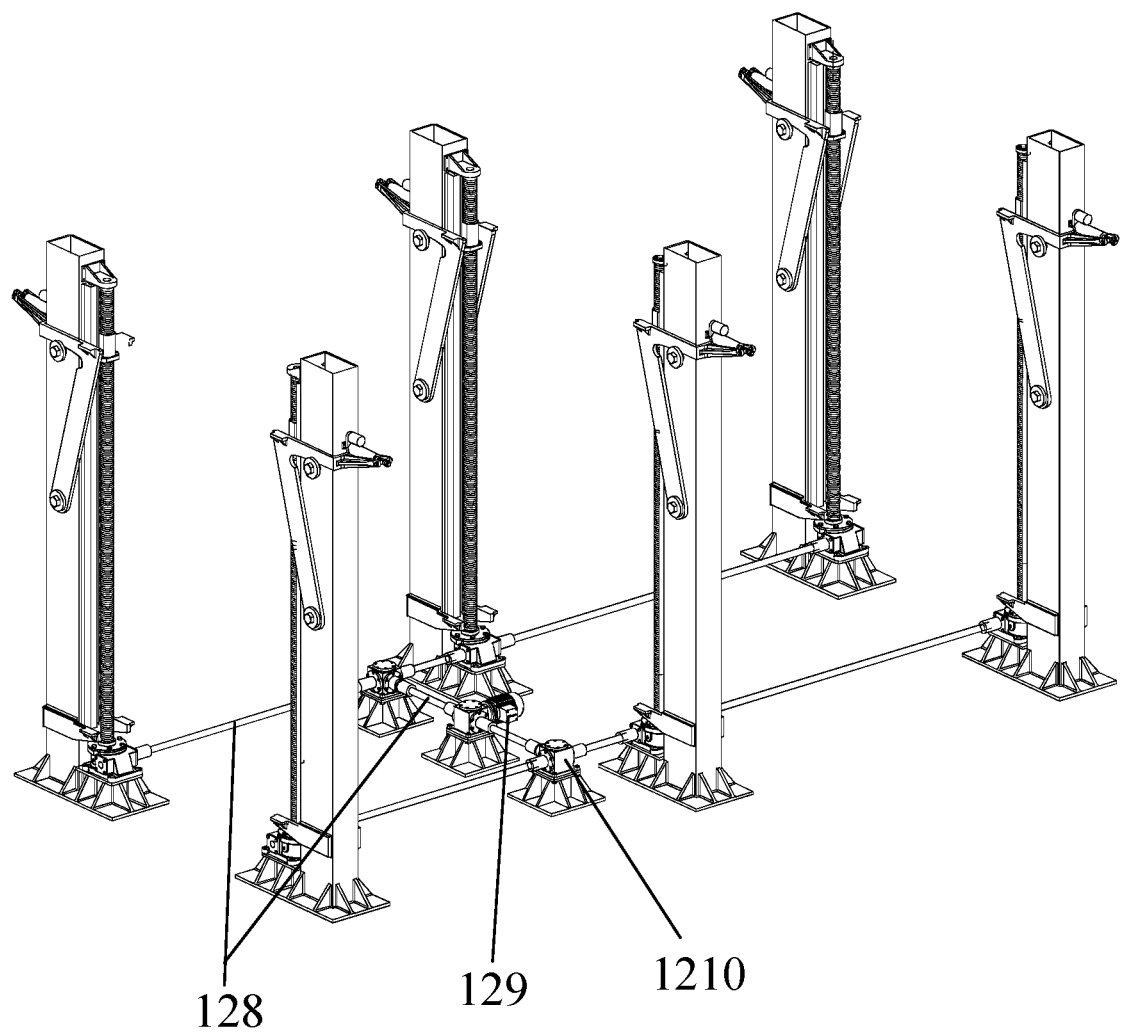
FIG. 8 is a schematic diagram of an arrangement of a screw-based synchronous lifting mechanism in a rail lifting system.
Figure 9:
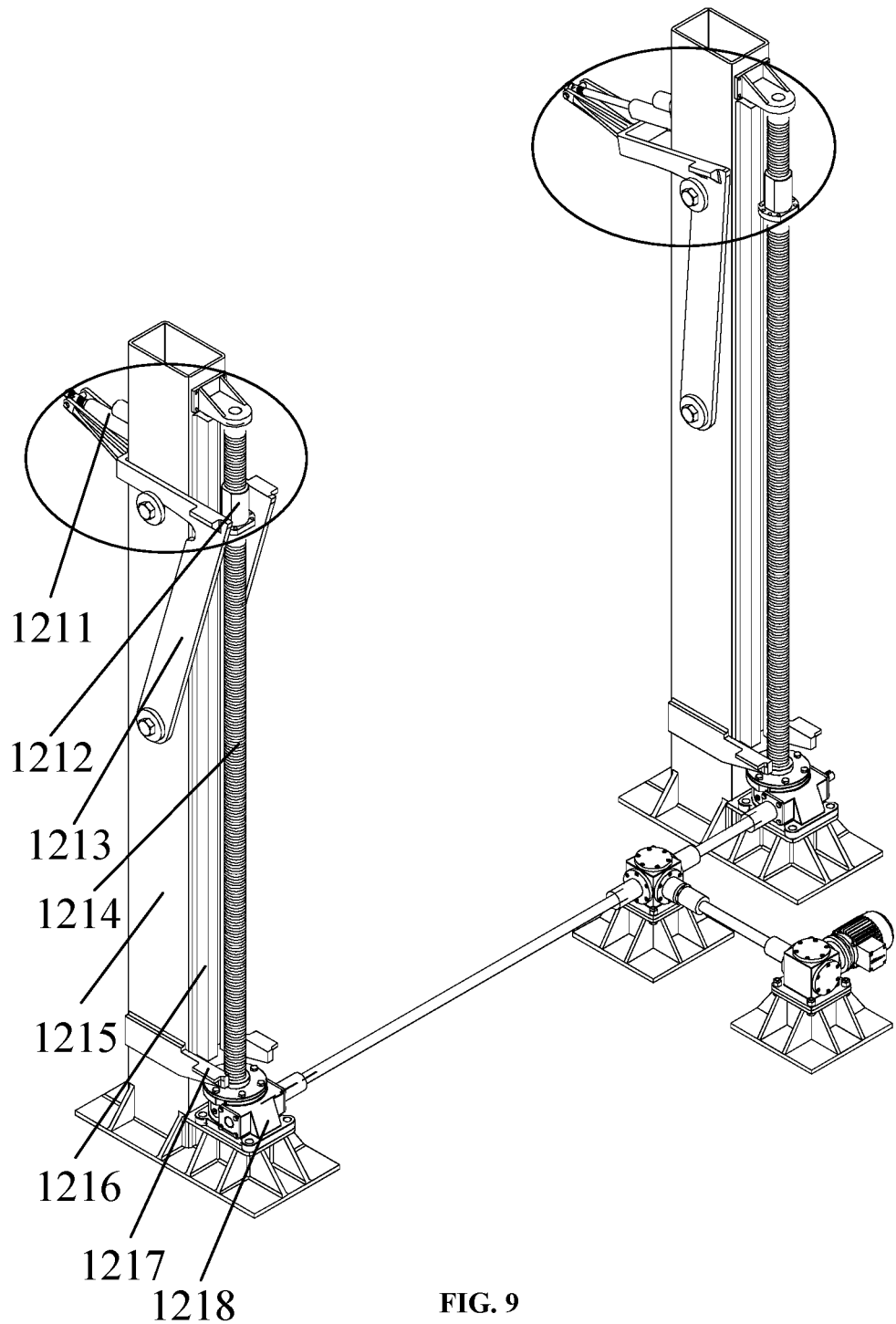
FIG. 9 is a structural schematic diagram of a screw elevator in a screw-based synchronous lifting mechanism.
Figure 10:
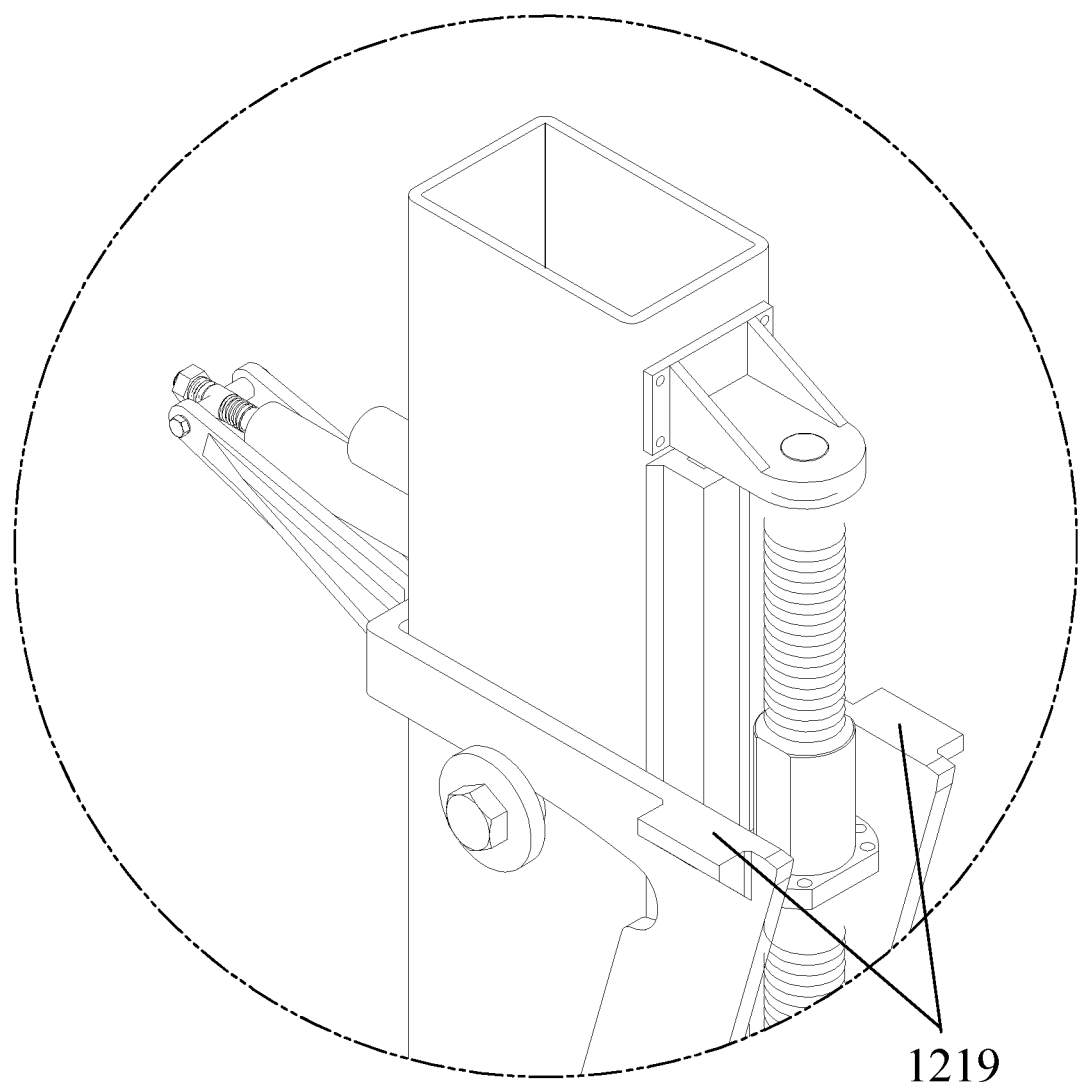
FIG. 10 is a schematic diagram of an upper movable support frame which is laid down.
Figure 11:
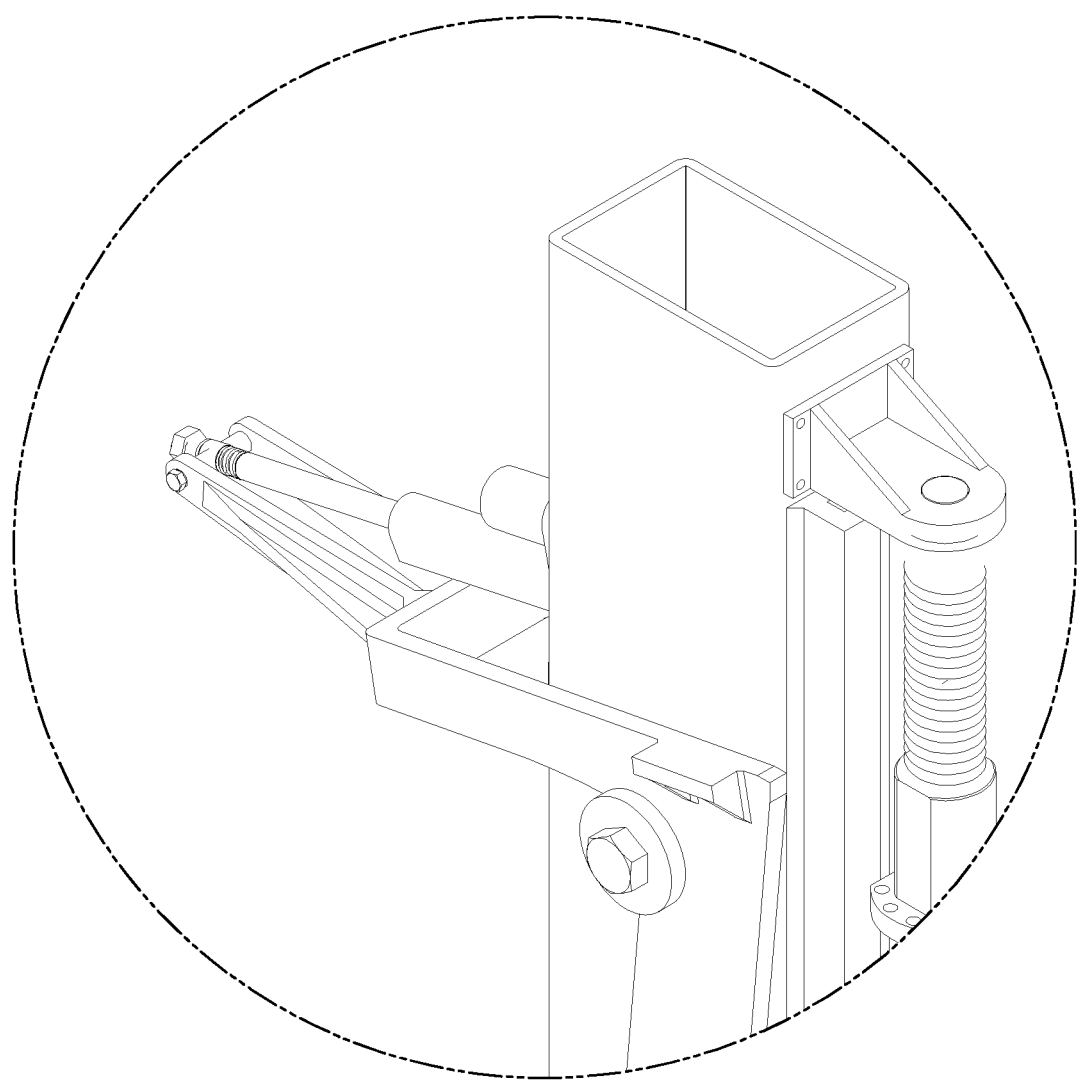
FIG. 11 is a schematic diagram of an upper movable support frame which is retracted.
Figure 12:
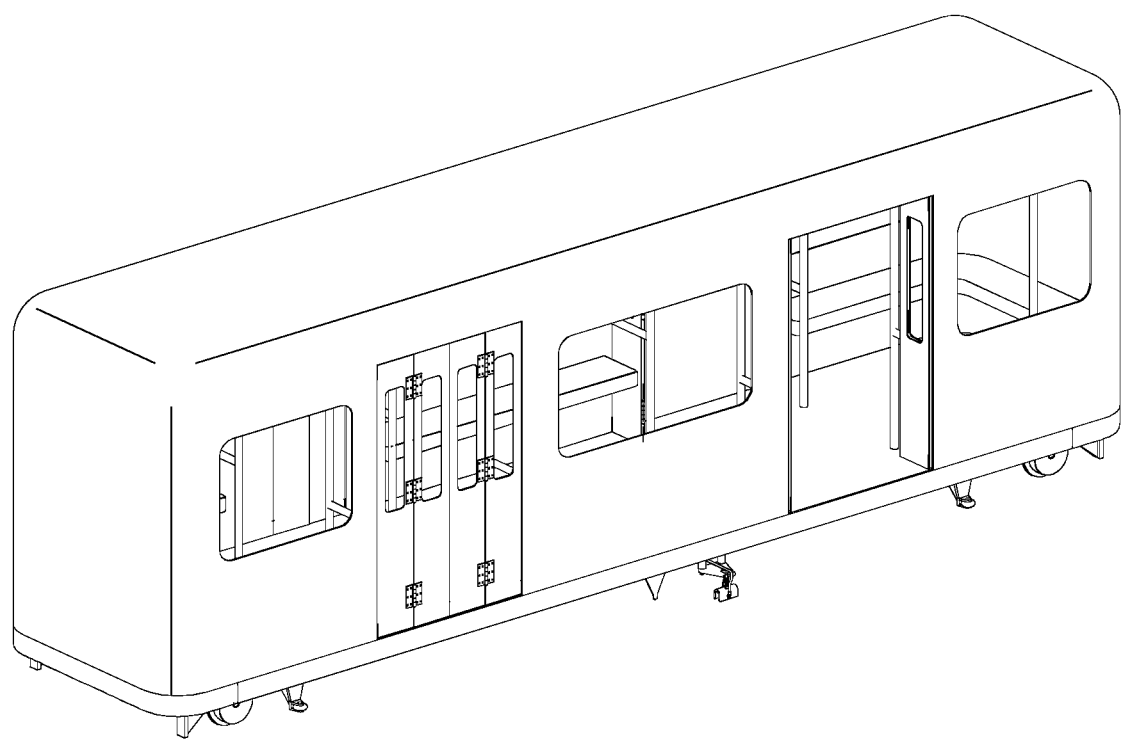
FIG. 12 is a schematic diagram of a passenger transportation trolley.
Figure 13:
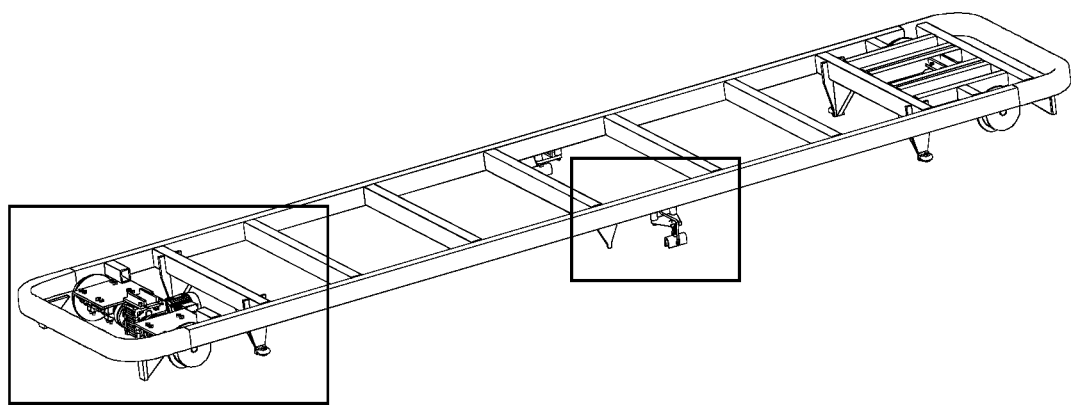
FIG. 13 is a structural schematic diagram of a chassis of a passenger transportation trolley.
Figure 14:
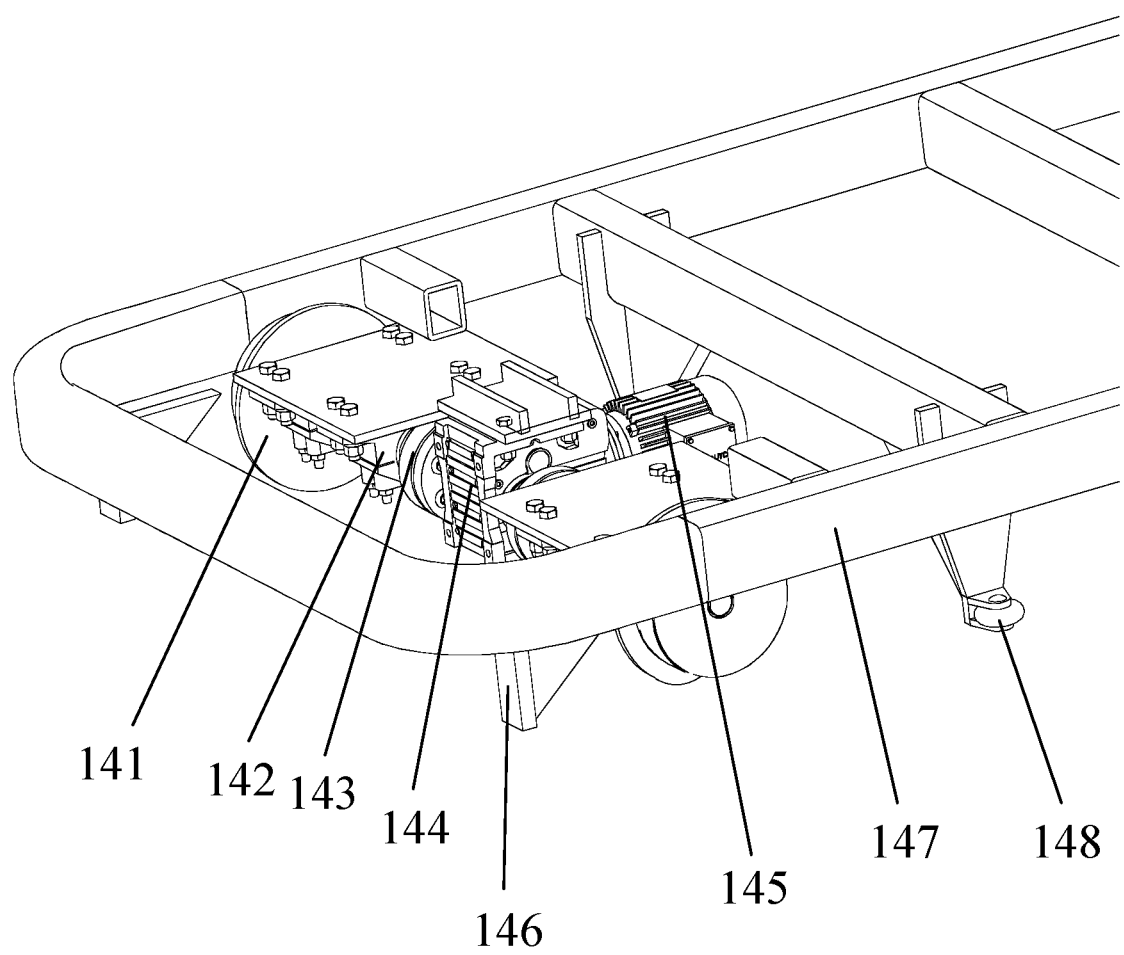
FIG. 14 is a partially enlarged schematic diagram of a chassis structure of a passenger transportation trolley.
Figure 15:
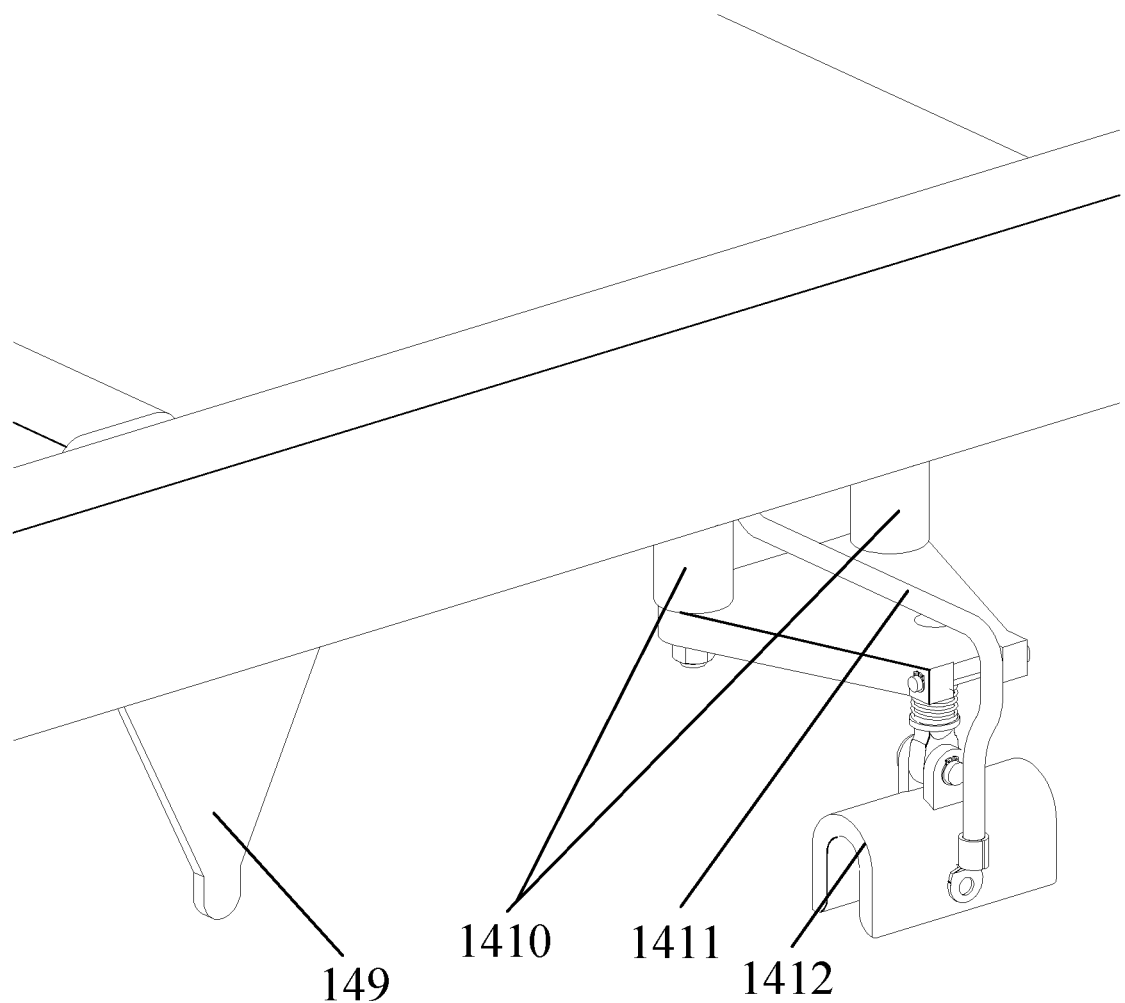
FIG. 15 is a partially enlarged schematic diagram of a chassis structure of a passenger transportation trolley.
Figure 16:
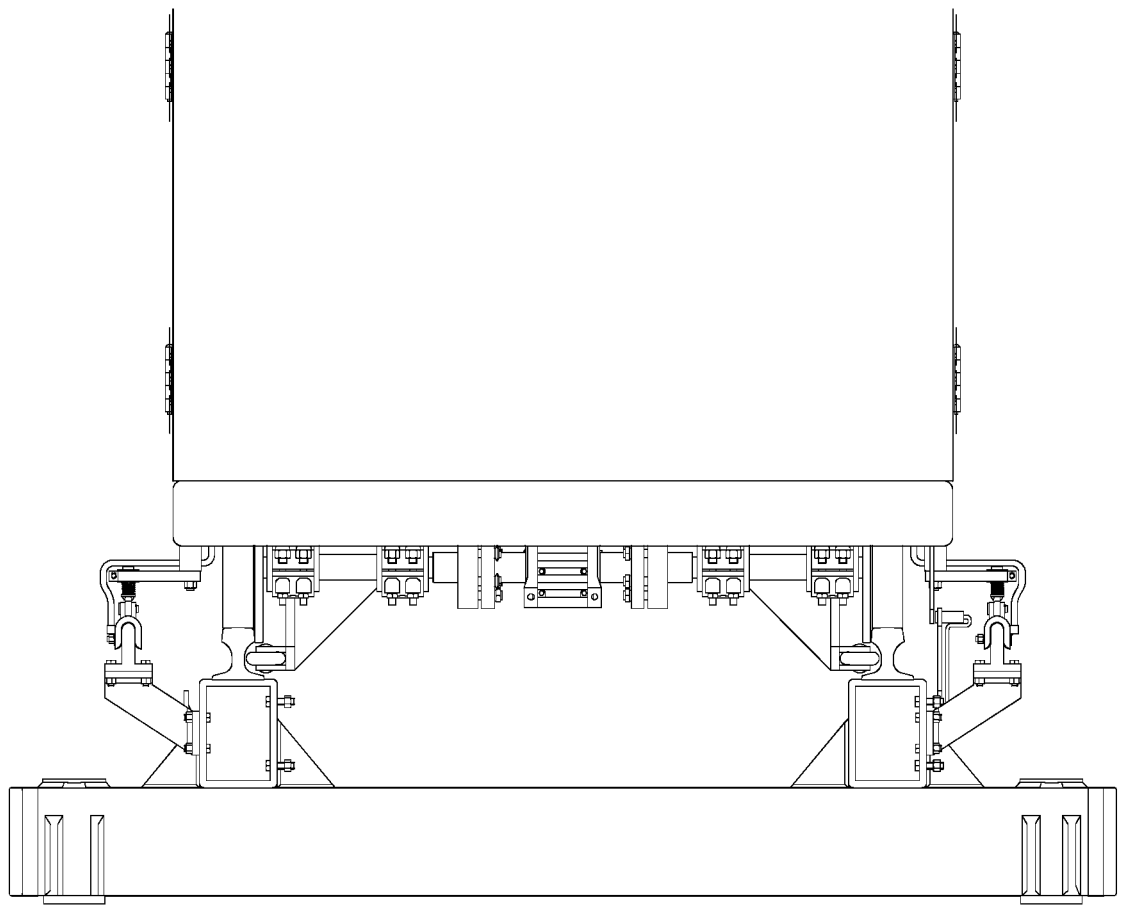
FIG. 16 is a schematic diagram of a positional relationship between a passenger transportation trolley and a rail system.
Figure 17:
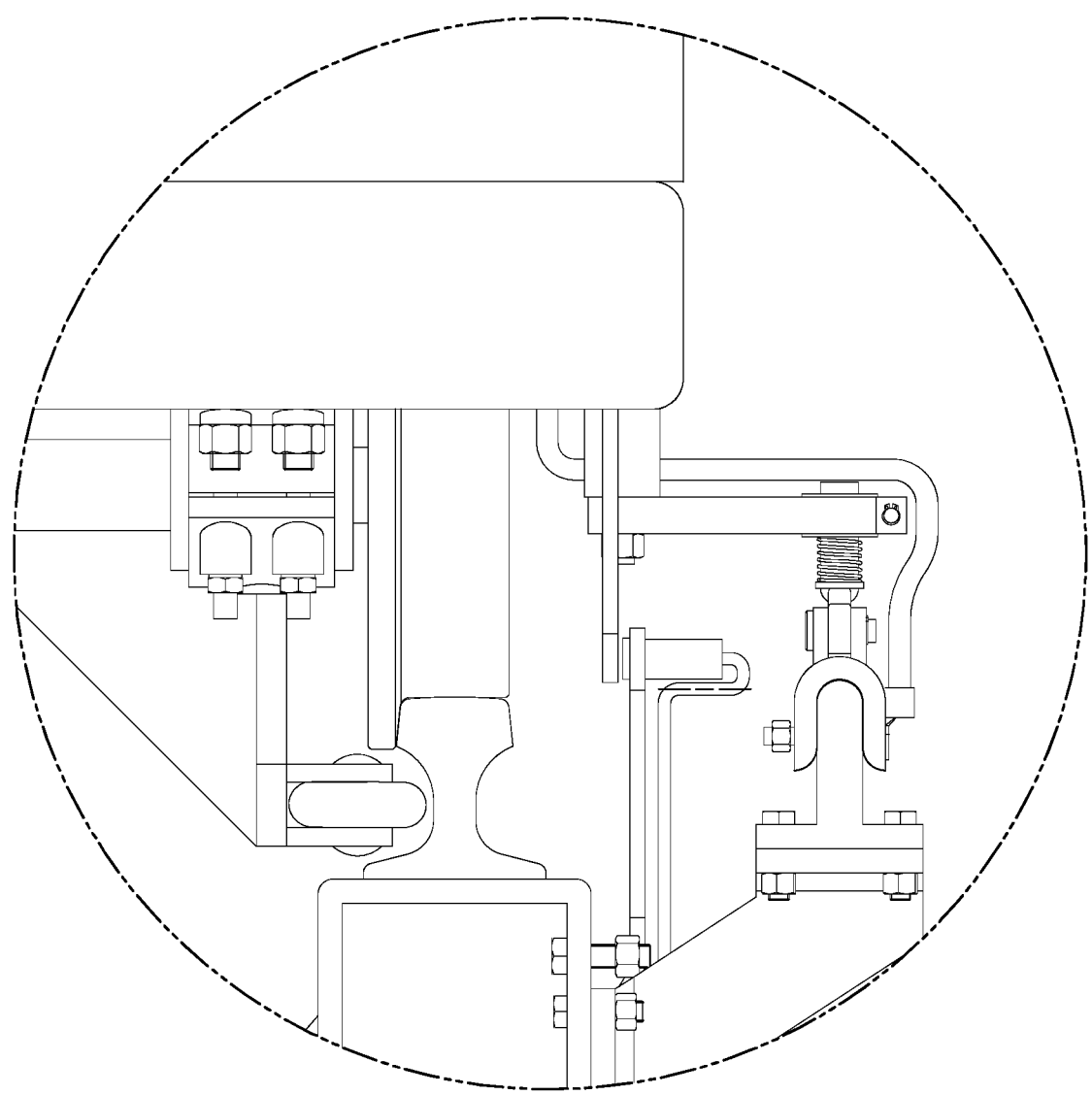
FIG. 17 is a partially enlarged schematic diagram of a positional relationship between a passenger transportation trolley and a rail system.
Figure 18:
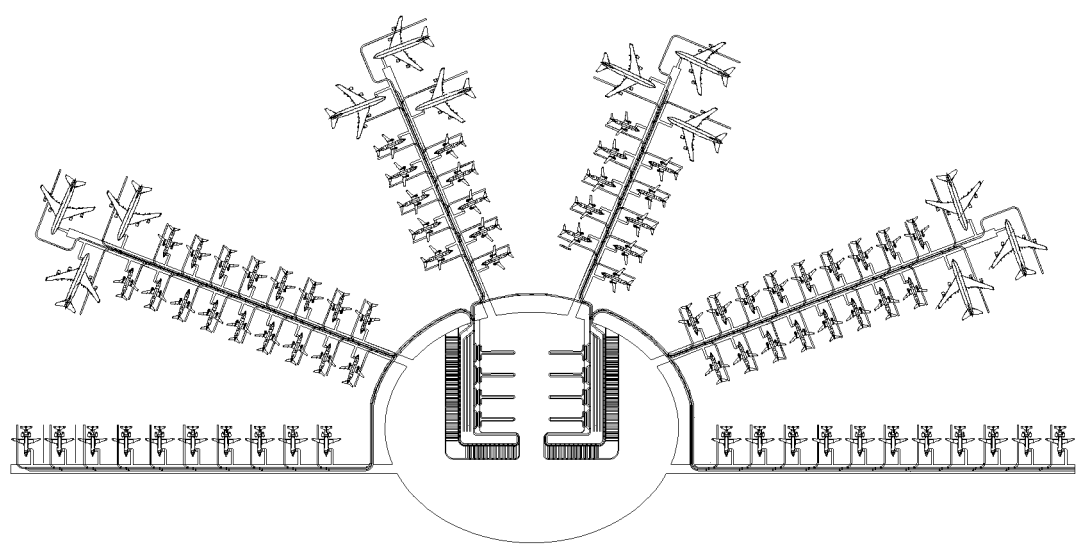
FIG. 18 is a top view of an unmanned, rapid and full-plane circular transportation system for passengers and luggage.
Figure 19:
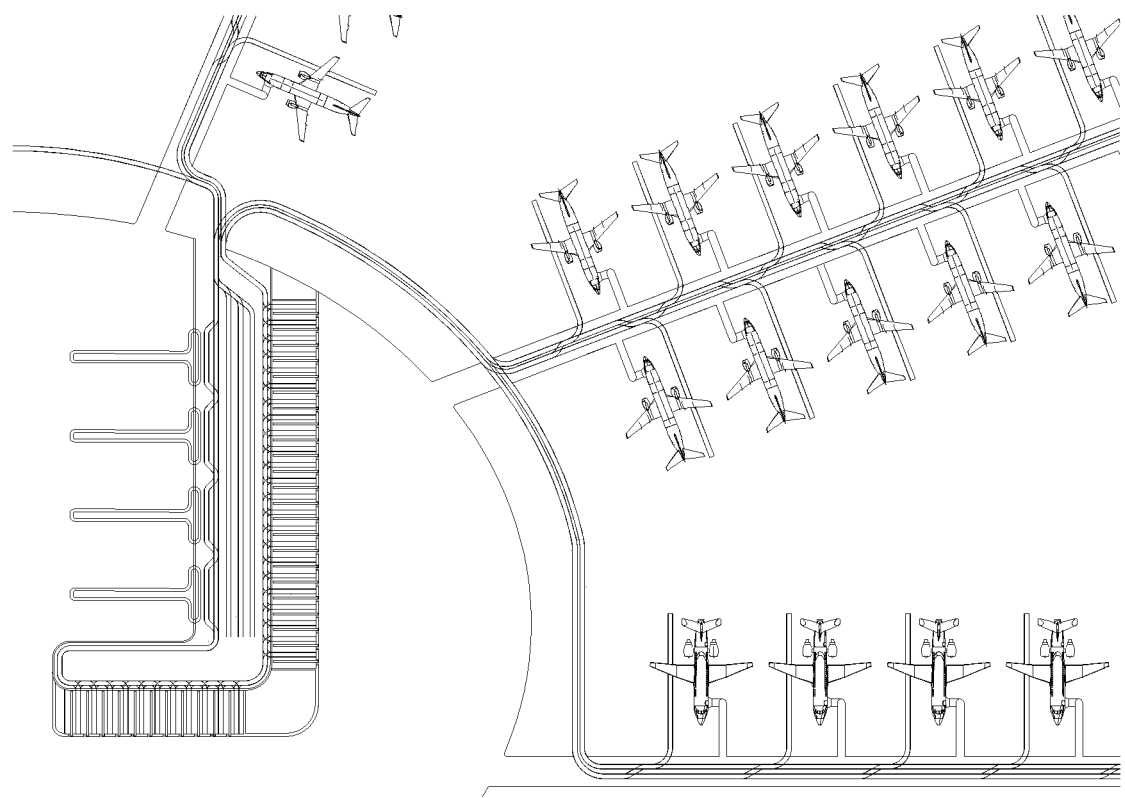
FIG. 19 is a partially enlarged view of a top view of an unmanned full-plane or local-interchange circular transportation system for passengers and luggage.
Figure 20:
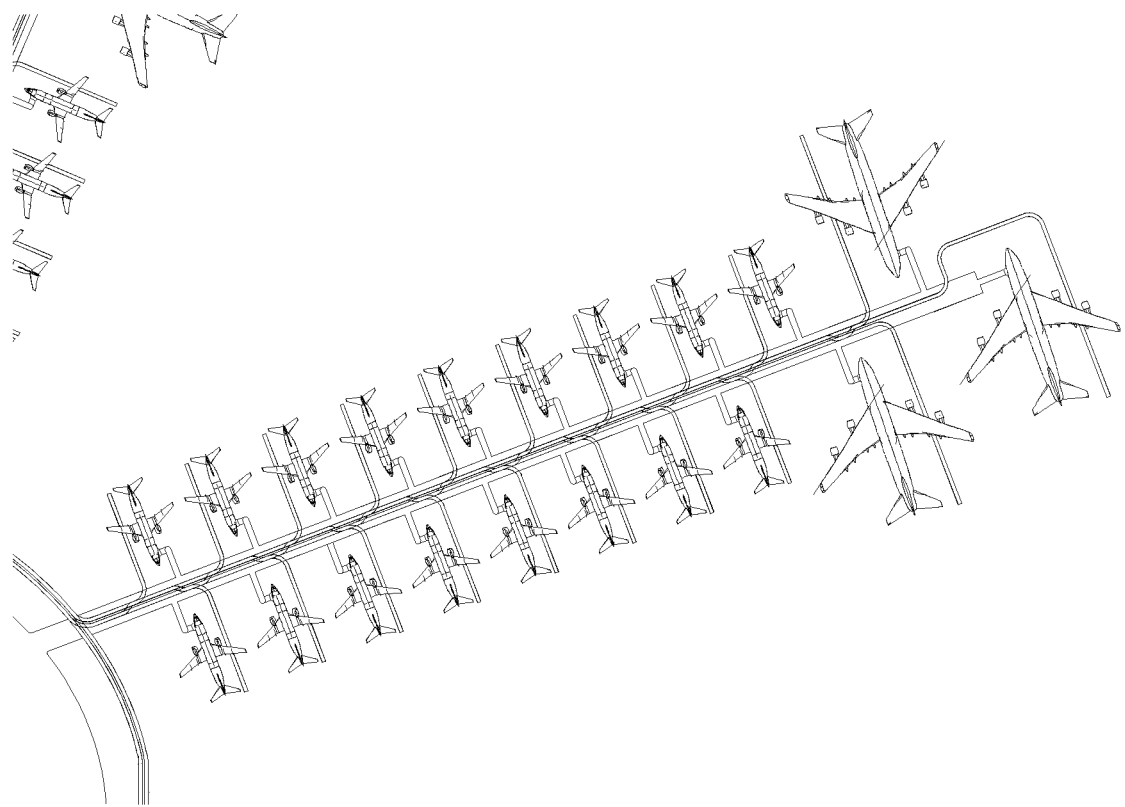
FIG. 20 is a schematic diagram of a corridor part in a top view of an unmanned, rapid and full-plane circular transportation system for passengers and luggage.

As shown in FIG. 2, after a passenger scans a QR code by holding a boarding card on the ground of the corridor 16, the automatic door 112 opens to allow the passenger to enter the passenger transportation trolley 14. If the boarding card held by the passenger does not pertain to the flight at the corridor, a voice prompt of wrong place is given to the passenger, avoiding the passenger from getting on the wrong trolley to miss the flight. The time of departure may be controlled at a timing interval or manually by a camera surveillance person. Entrances of the lounge bridge 17 on two sides within the corridor are even-numbered and odd-numbered, respectively, i.e., one odd-numbered and the other one even-numbered. The passenger transportation trolley 14 stops at the corresponding lounge bridge 17 entrance according to the passenger's boarding information, and the passenger may rapidly arrive at the lounge bridge 17 entrance with one stop according to the display screen in the passenger transportation trolley 14 and a voice prompt. The passenger enters the lounge bridge 17 for boarding. The passenger transportation trolley 14 enters the rail facility lifting system 13 at a low speed after passing through the terminal station. When the position sensor board of the passenger transportation trolley 14 reaches the corresponding position of the position sensor 127, the position sensor 127 sends an in-position signal to the control system, and the control systems wirelessly sends a stop command to the passenger transportation trolley 14. The passenger transportation trolley 14 stops, or may also directly enter the parking system 15 through the rail of the rail facility lifting system 13. At this time, although the internally threaded elevating sleeve 1212, which is restricted by the longitudinal guiding sliding sleeve 126 from rotating and only to slide vertically within the sleeve, is located within the longitudinal guiding sliding sleeve 126, the supporting platform protruding from the lower portion thereof is not in contact with the bottom palm 124 of the overall rail facility 122, and the bottom palm 124 of the overall rail facility 122 falls on the lower fixed support frame 1217 for the rail under the action of the gravity of the overall rail facility 122 to realize accurate leveling. That is, the rail and the trolley conductor on the overall rail facility 122 are aligned with the lower rail 155 and the trolley conductor 118 of the rail system 11 and the lower rail and the trolley conductor of the parking system 15. After the passenger transportation trolley 14 stops and the position sensor feeds back a stop acknowledgment signal to the control system, the control system sends a start command to the driving motor 129. The driving torque of the motor causes all the elevating screws 1214 to rotate synchronously through the commutator 1210, the transmission shaft 128 and the lead screw elevator 1218, allowing all the internally-threaded elevating sleeves 1212 to move upwards synchronously. The internally-threaded elevating sleeve 1212 slides upwards to prop against the bottom palm 124 of the overall rail facility 122 and then moves upwards along with the overall rail facility 122 and the passenger transportation trolley 14. The ring-shaped longitudinal slider 125 is arranged in the middle of the overall rail facility 122, and square sliders at two ends have gaps with the longitudinal direction of the vertical guide groove 1216. The overall rail facility 122 is capable of slightly swinging with the center of the ring-shaped longitudinal slider 125 as the origin to avoid the phenomenon of getting stuck resulting from that the screws 1214 may not rotate synchronously in the process of lifting and lowering. At this time, the telescopic rod of the electric push rod 1211 with starting and finishing position sensors extends out, and the upper movable support frame 1213 is retracted outwards (as shown in FIG. 11) to keep away from the upward movement of the overall rail facility 122. After the overall rail facility 122 moves upwards to the predetermined position, the position sensor sends an in-position signal to the control system, and the control system sends a command to make the driving motor 128 stop operating. After the position sensor sends a stop acknowledgment signal to the control signal, the control system sends a telescopic rod retracting command to the electric push rod 1211. The upper movable support frame 1213 for the rail is laid down (as shown in FIG. 10). After the telescopic rod of the electric push rod 1211 is retracted to the starting position, the starting position sensor sends a telescopic rod retraction in-position acknowledgment signal to the control signal. The control system sends a reverse start command to the driving motor 129. The internally-threaded elevating sleeve 1212 falls along with the overall rail facility 122 until the bottom palm 124 of the overall rail facility 122 comes into contact with the palm 1219 of the movable support frame 1213. After the internally-threaded elevating sleeve 1212 continues to fall for a small distance, the position sensor sends an in-position stop acknowledgment signal to the control signal and then the control system sends a stop command to the driving motor 129. At this time, the upper half part of the internally-threaded elevating sleeve 1212 is still within the longitudinal guiding sliding sleeve 126, and the overall rail facility 122 is accurately level with the upper deck of the rail system 11 and the upper deck of the parking system 15. The passenger transportation trolley 14 may turn left to pull out of the overall rail facility 122 or turn right to drive into the parking system 15. The upper and lower waiting platforms 114 of the stops along the return route may be provided with calling buttons or infrared sensing devices. The passenger transportation trolley may stop only when there is a passenger at the waiting platform. The passenger transportation trolley 14 turns left to reach the terminal station to allow all passengers to get off and then drives into the overall rail facility lifting system 12 at a low speed. At this time, the bottom palm 124 of the overall rail facility 122 falls onto the palm 1219 of the movable support frame 1213 and has been accurately level with the upper deck of the rail system 11. The passenger transportation trolley 14 stops when the position sensor board 149 thereof approaches the position sensor 127, and then the overall rail facility 122 stops after moving upwards along with the passenger transportation trolley 14 for a small distance. The telescopic rod of the electric push rod 1211 extends out and the movable support frame 1213 is retracted (as shown in FIG. 11). The passenger transportation trolley 14 moves downwards along with the overall rail facility 122 and the internally-threaded elevating sleeve 1212 until the bottom palm 124 of the overall rail facility 122 falls onto the palm 1217 of the fixed support frame, and the internally-threaded elevating sleeve 1212 continues to fall for a small distance and then stops. At this time, the overall rail 122 is accurately level with the lower deck of the rail system 11. Thus, the passenger transportation trolley 14 completes a cycle.

Figure 21:
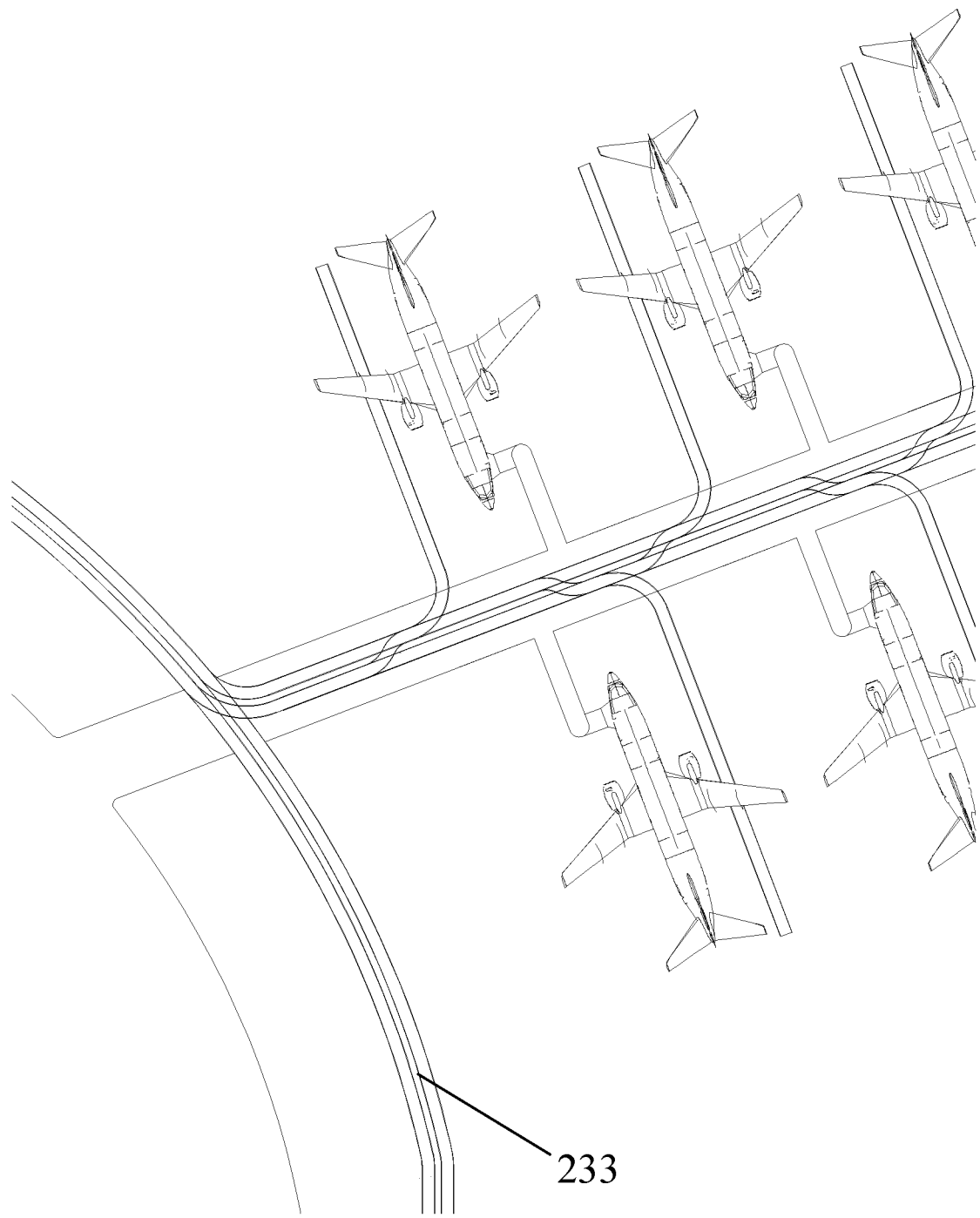
FIG. 21 is a partially enlarged diagram of a corridor part in a top view of an unmanned, rapid and full-plane circular transportation system for passengers and luggage.
Figure 22:
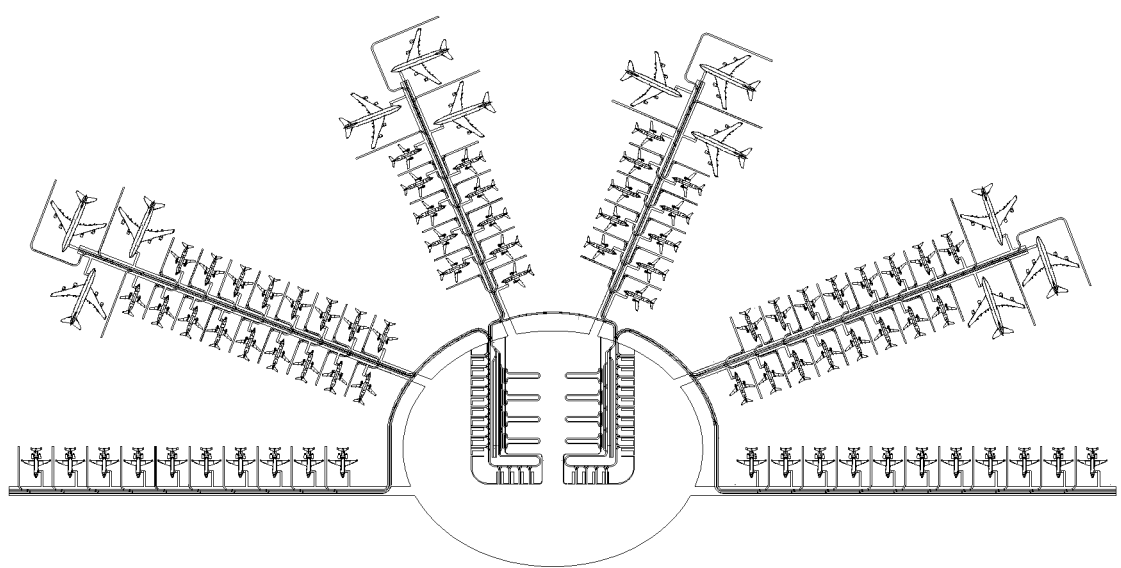
FIG. 22 is a top view of an unmanned, rapid and local-interchange circular transportation system for passengers and luggage.
Figure 23:
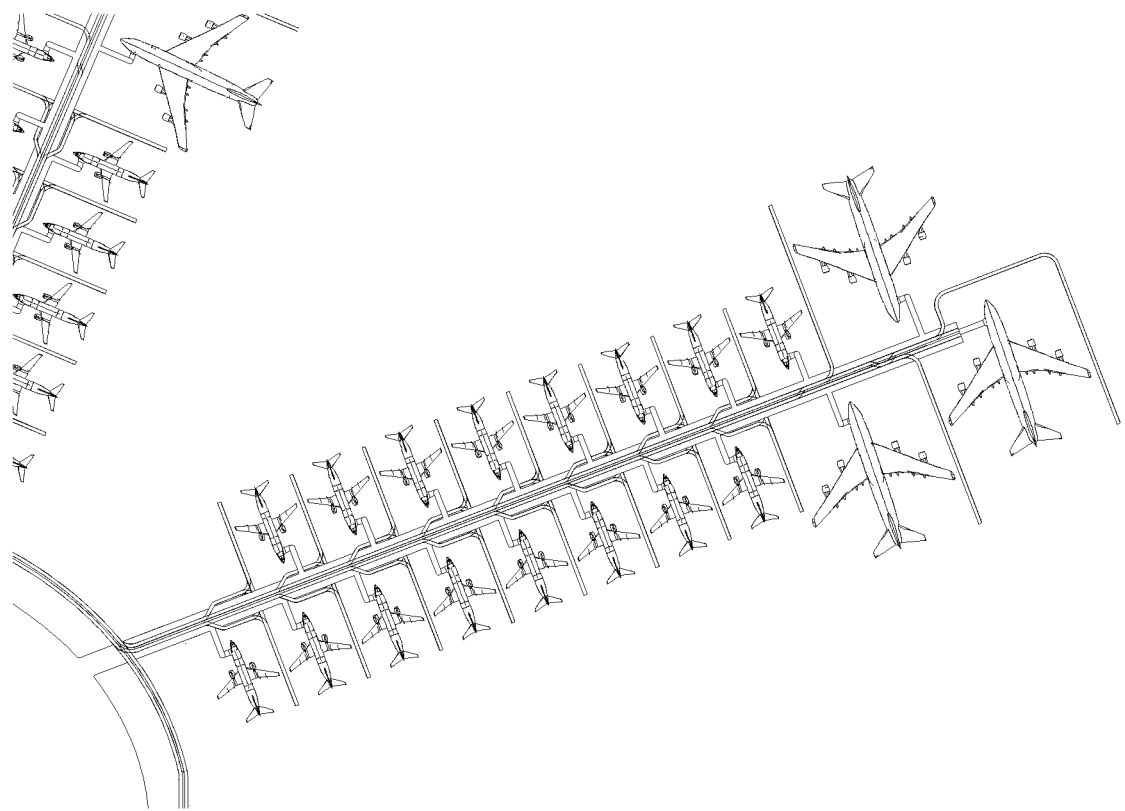
FIG. 23 is a schematic diagram of a corridor part in a top view of an unmanned, rapid and local-interchange circular transportation system for passengers and luggage.
Figure 24:
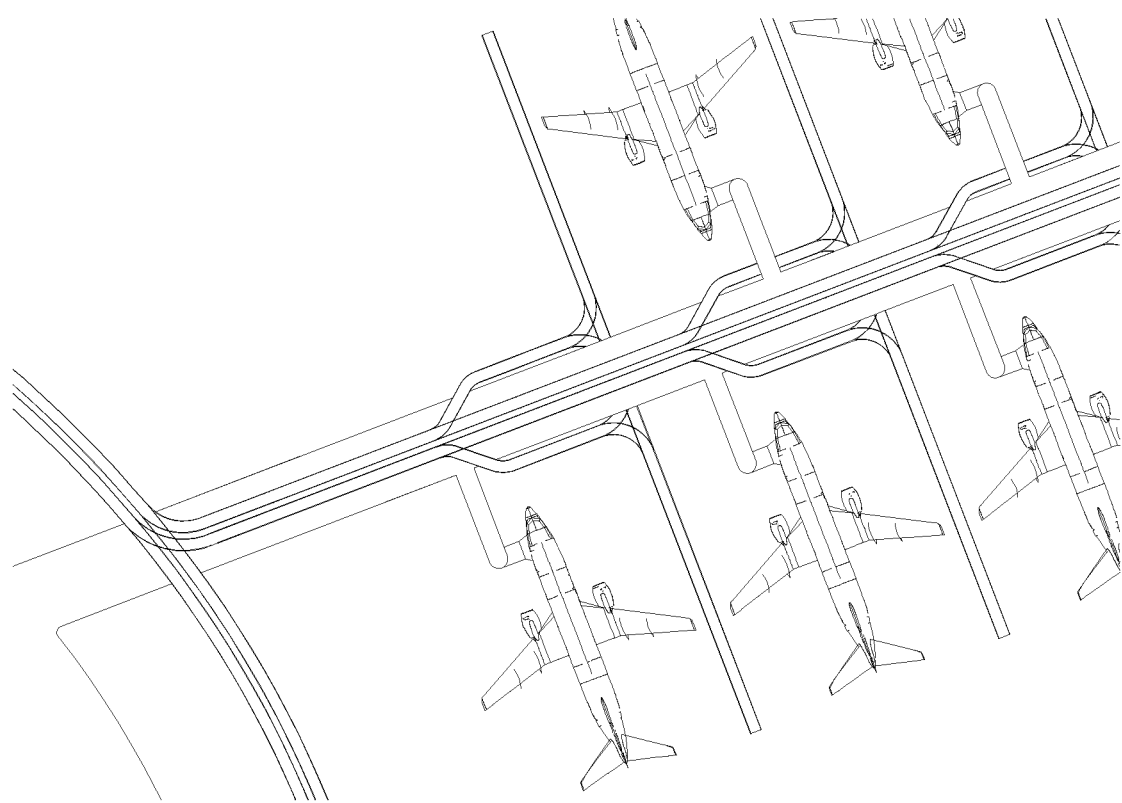
FIG. 24 is a partially enlarged diagram of a corridor part in a top view of an unmanned, rapid and local-interchange circular transportation system for passengers and luggage.
Figure 25:
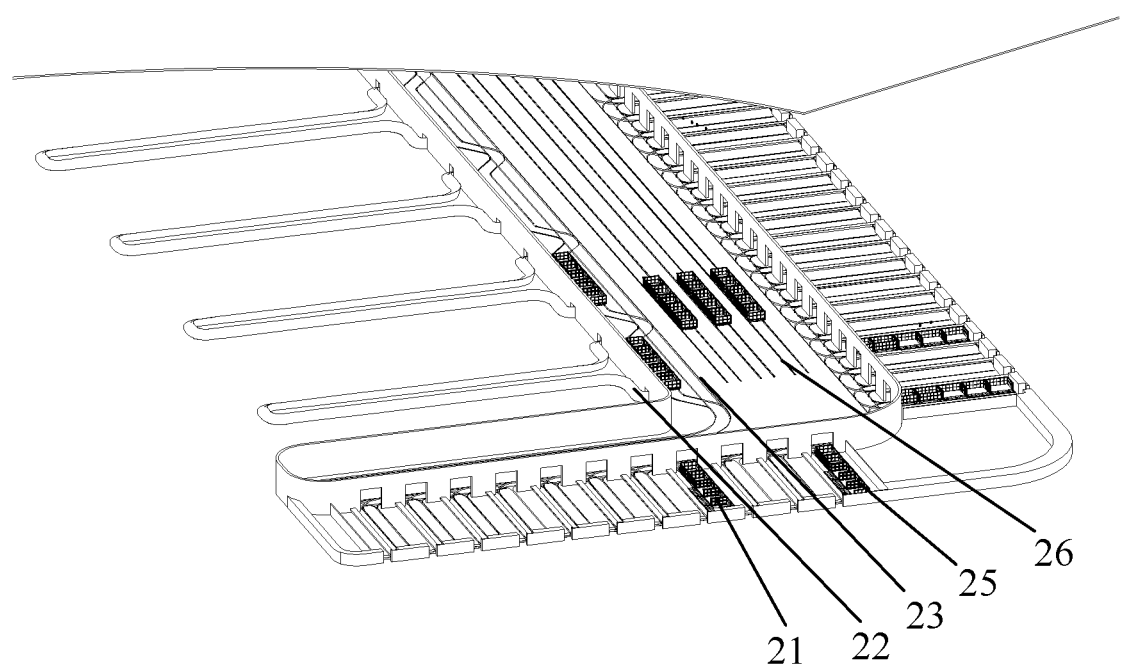
FIG. 25 is an arrangement diagram of a central area part of an unmanned, rapid and full-plane or local-interchange circular transportation system for passengers and luggage.
Figure 26:
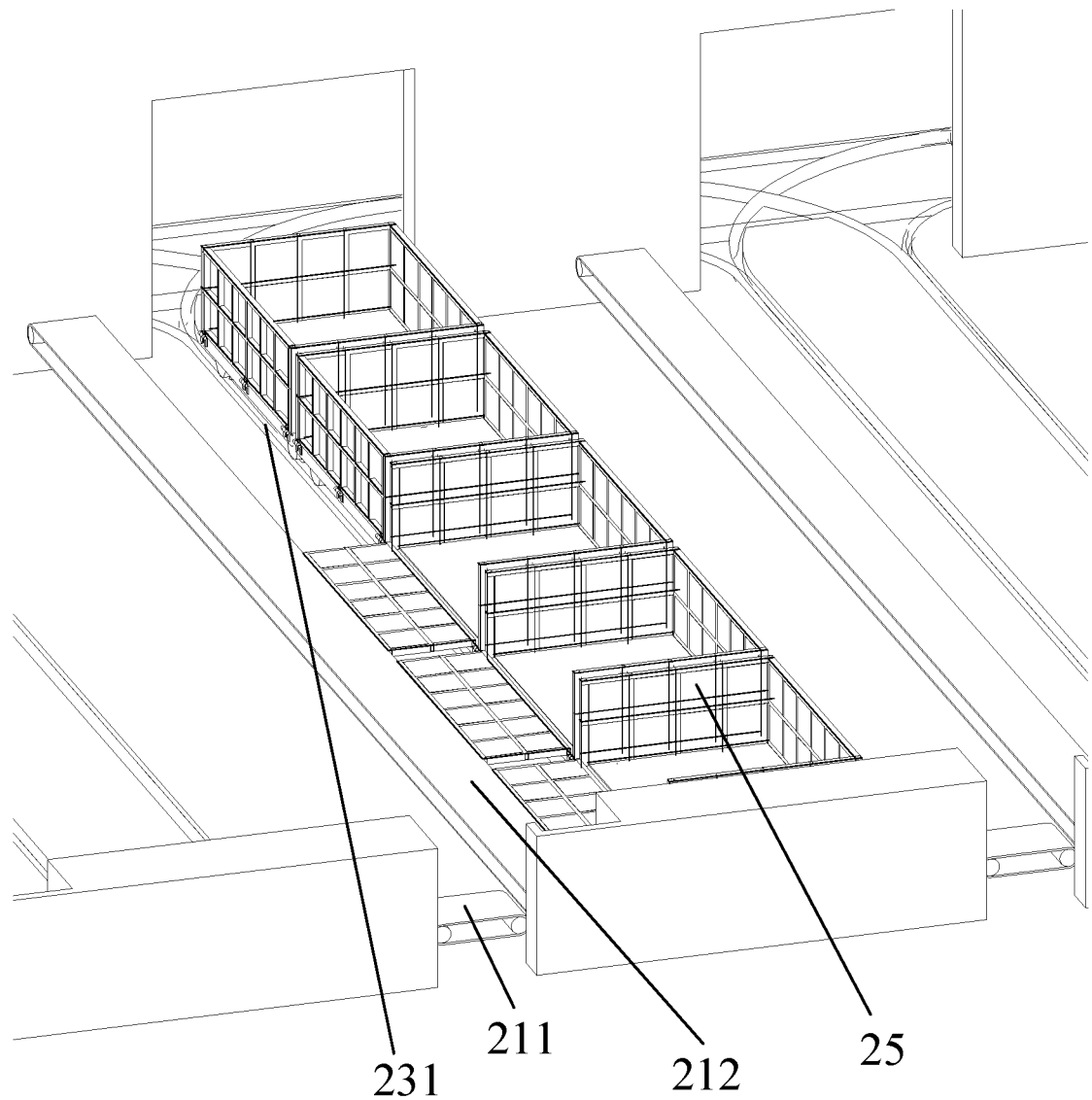
FIG. 26 is an arrangement diagram of a passenger's luggage registration system.
Figure 27:
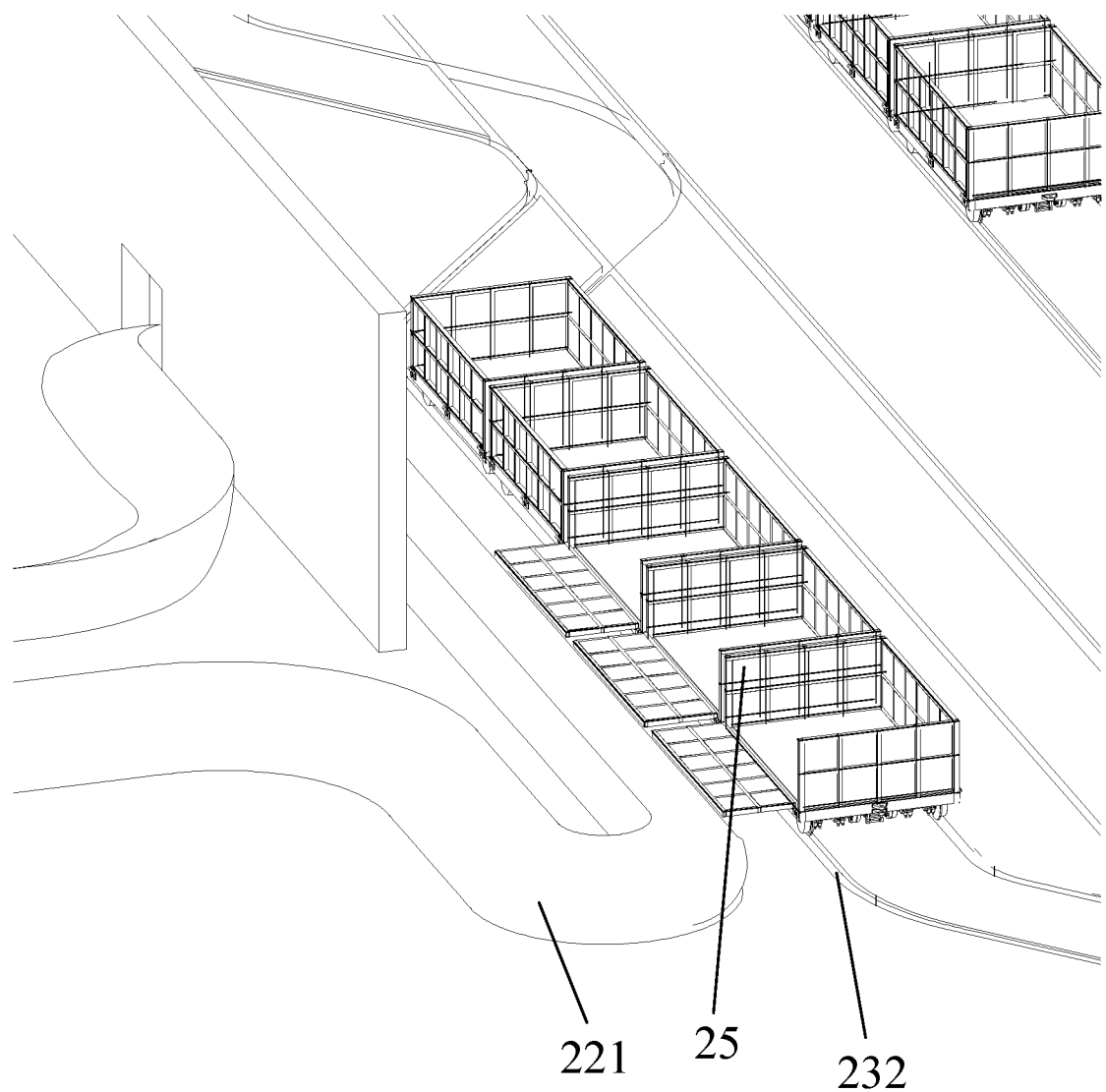
FIG. 27 is an arrangement diagram of a passenger's luggage pick-up system.
Figure 28:
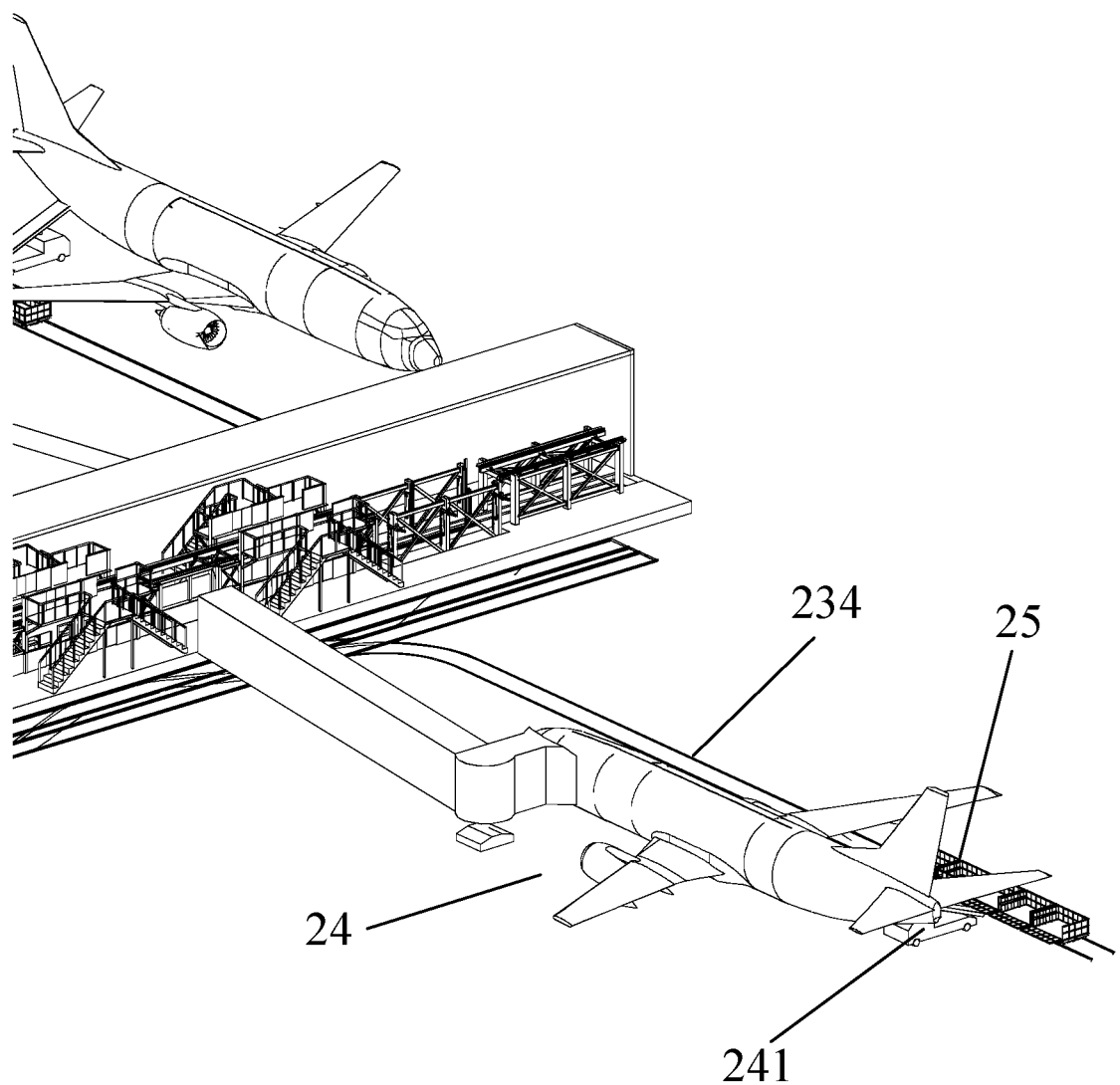
FIG. 28 is an axonometric schematic diagram of a passenger plane-side system of a passenger's luggage transportation system.

According to a specific embodiment of the present disclosure, an unmanned, rapid and full-plane or local-interchange circular transportation system for passengers' luggage is provided. Complete circular transportation involves registration by a passenger, the powered vehicle group for luggage transportation traveling to the passenger plane which is about to take off, unloading from the vehicle and loading to the plane, the powered vehicle group for luggage transportation traveling to an arriving passenger plane, unloading from the plane and loading to the vehicle, the powered vehicle group for luggage transportation traveling to the luggage pick-up system for unloading, and the powered vehicle group for luggage transportation traveling to the luggage registration system, and a complete cycle is finished. As shown in FIG. 18, FIG. 22, FIG. 26, FIG. 27 and FIG. 28, specifically, passenger's luggage enters the horizontal conveying belt 212 after passing through the belt weigher 211 and then enters the powered vehicle group 25 for luggage transportation, and the registration procedure is completed. Since the time of departure of a passenger plane flight is fished, the control system prompts getting ready for departure several minutes before departure, and the service staff must finish all loading work within the required time and send a completion acknowledgment signal to the control center. At this time, the spur where the powered vehicle group 25 for luggage transportation enters has been set to the right-turn direction, and the powered vehicle group 25 for luggage transportation turns right to enter the major circular rail of the luggage transportation rail system 23 and enters the corridor after passing through the annular connecting rail 233 (as shown in FIG. 21). If the plane is on the right side (in the direction of forward motion of loading, the same below), the powered vehicle group for luggage transportation pulls out of the major circular rail through the right-turn spur until the passenger plane-side branch rail 234 of the passenger plane-side luggage loading and unloading system 24 (as shown in FIG. 28), and loading to the plane is completed by the luggage loading and unloading truck 241. If the plane is on the left side, the powered vehicle group for luggage transportation enters the major circular rail on the left side through the left-turn spur and then turns left to pull out of the major circular rail and enter the passenger plane-side branch rail 234 of the passenger plane-side luggage loading and unloading system 24, and loading to the plane is completed. According to the local-interchange solution (as shown in FIG. 24), if the plane is on the right side, the powered vehicle group for luggage transportation pulls out of the major circular rail through the right-turn spur and enters the downhill auxiliary lane, and then travels uphill through the right-turn spur to enter the passenger plane-side branch rail 234 of the passenger plane-side luggage loading and unloading system 24 (as shown in FIG. 28). If the plane is on the left side, the powered vehicle group for luggage transportation enters the lateral transfer rail through the left-turn spur after passing through the downhill auxiliary lane, and then travels uphill until entering the passenger plane-side branch rail 234 of the passenger plane-side luggage loading and unloading system 24 for loading to the plane. For unloading from an arriving flight, after the arriving flight passenger plane stops fully, the powered vehicle group 25 for luggage transportation enters the passenger plane-side branch rail 234 on the right side of the passenger plane, and the luggage is unloaded from the passenger plane to the powered vehicle group 25 for luggage transportation through the luggage loading and unloading truck 241. If on the right side, the powered vehicle group 25 for luggage transportation turns left to enter the major circular rail on the right side of the corridor and then turns right to enter the major circular rail on the left side of the corridor, and then enters the luggage pick-up system 22 after passing through the annular connecting rail 233 (as shown in FIG. 27), and the luggage is unloaded onto the circular plate-type conveying belt 221, thereby completing unloading. If on the left side, the powered vehicle group 25 for luggage transportation turns right to enter the major circular rail on the left side of the corridor, and then enters the luggage pick-up system 22 after passing through the annular connecting rail 233 (as shown in FIG. 27), and the luggage is unloaded onto the circular plate-type conveying belt 221, thereby completing unloading. According to the local-interchange solution (as shown in FIG. 24), if on the right side, the powered vehicle group 25 for luggage transportation goes straight downhill to pass through the major circular rail 23 through the lateral transfer rail and then turns left to enter the auxiliary lane and travel uphill, then turns left to enter the major circular rail on the left side, and then enters the luggage pick-up system 22 after passing through the annular connecting rail 233 (as shown in FIG. 27), and the luggage is unloaded onto the circular plate-type conveying belt 221, thereby completing unloading. If on the left side, the powered vehicle group 25 for luggage transportation goes straight downhill and then turns right to enter the auxiliary lane and travel uphill, then turns left to enter the major circular rail on the left side, and then enters the luggage pick-up system 22 after passing through the annular connecting rail 233 (as shown in FIG. 27), and the luggage is unloaded onto the circular plate-type conveying belt 221, thereby completing unloading. The control system displays the flight number and the place of departure and the destination of this batch of luggage on the prompting screen, and the circular plate-type conveying belt 221 conveys the luggage to the luggage pick-up hall for picking up by passengers.

Specific examples are used herein for illustration of the principles and embodiments of the present disclosure. The above description of the embodiments is only intended to help understand the method of the present disclosure and its core ideas. Moreover, those of ordinary skill in the art can make various modifications to specific embodiments and the scope of application in accordance with the ideas of the present disclosure. In conclusion, the content of the present description shall not be construed as a limitation to the present disclosure.

What is claimed is:

1. An unmanned, rapid and circular transportation system for airport passengers and luggage, comprising an unmanned, rapid and vertical circular transportation system (1) for passengers, an unmanned, rapid and full-plane or local-interchange circular transportation system (2) for passengers' luggage, and a control system;

wherein the unmanned, rapid and vertical circular transportation system (1) for passengers comprises a double-deck passenger transportation rail system (11), an overall rail facility lifting system (12), a passenger transportation trolley (14) and a parking system (15) for overhaul, maintenance and surplus vehicles;

the double-deck passenger transportation rail system (11) is disposed at a second floor of a corridor and comprises upper and lower rails (115) mounted fixedly for the passenger transportation trolley (14) to travel thereon and upper and lower trolley conductors (118) for the passenger transportation trolley to acquire power; the upper rail (115) and a rail beam (116) are supported by a steel column (111); the trolley conductors (118) are arranged outside the rails (115); the upper trolley conductor (118) is fixed to the rail beam (116) by means of an insulator support (117), while the lower trolley conductor 118 is concealed; all stops have respective automatic doors (112) and upper waiting platforms (114), and the ground along the entire route is enclosed totally with a safety fence (113); all the stops have respective position sensors and video surveillance devices, and each position sensor (127) is fixed to the rail beam by means of a support thereof;

the overall rail facility lifting system (12) comprises: an overall rail facility (122) which comprises a rail, a trolley conductor, a removable stopper (123), an overall rail facility bottom palm (124), a ring-shaped longitudinal slider (125), a longitudinal guiding sliding sleeve (126) and the position sensors (127), and which has a rail and a trolley conductor arrangements thereon consistent with those of the rail system (11); vertical guide grooves (1216) arranged on a plurality of vertically mounted steel columns (1215) to restrict the overall rail facility (122) to only rise and fall vertically; a driving motor (129), a commutator (1210), a transmission shaft (128), a lead screw elevator (1218), an elevating screw (1214) and an internally threaded elevating sleeve (1212) that cause the overall rail facility (122) to rise and fall; and a lower fixed support frame (1217) and an upper movable support frame (1213) to guarantee that the rail and the trolley conductor on the overall rail facility (122) is accurately aligned with the upper and lower rails and trolley conductors of the double-deck passenger transportation rail system (11) and the upper and lower rails and trolley conductors of the parking system (15); a cable in a cable drag chain (121) allows the trolley conductors and the position sensors in the overall rail facility (122) to always keep connection with a power supply and the control system;

the unmanned, rapid and full-plane or local-interchange circular transportation system (2) for passengers' luggage comprises two identical independent and associated mirror freight transportation systems, each of which mainly comprises a passenger's luggage registration system (21), a passenger's luggage pick-up system (22), a full-plane or local-interchange luggage transportation rail system (23) with numerous rail switching spurs, a passenger plane-side luggage loading and unloading system (24), a powered vehicle group (25) for luggage transportation, and a system (26) for vehicle overhaul, maintenance, rechargeable battery pack replacement and surplus vehicle parking;

the unmanned, rapid and vertical circular transportation system for passengers (1) and the unmanned, rapid and full-plane or local-interchange circular transportation system (2) for passengers' luggage are uniformly controlled by a real-time sensing display system comprising the position sensors and surveillance cameras that are distributed throughout the double-deck passenger transportation rail system and the luggage transportation rail system, a holographic real-time simulation animation control system, and a distributed control system (DCS) comprising a system with a function of automatically grouping all rail network spurs.

2. The system according to claim 1, wherein the passenger transportation trolley (14) comprises a driving system comprising a driving motor (145), a speed reducer (144), a coupling (143) and a bearing seat (142); a safe traveling system comprising a chassis girder (147), a driving traveling wheel (141), a safety wheel (148) and a safety stopper (146); a power acquiring system comprising an insulating column (1410), a conductor (1411) and a collector clip (1412); a position sensor board (149) allowing the control system to sense a position thereof; an electronic control system; and a wireless communication module system.

3. The system according to claim 1, wherein the passenger's luggage registration system (21) comprises a belt weigher (211), a horizontal conveying belt (212) and a registration side branch rail (231); and the registration side branch rail (231) is arranged perpendicularly to a major circular rail of the unmanned, rapid and full-plane or local-interchange circular transportation system (2) for passengers' luggage.

4. The system according to claim 1, wherein the luggage pick-up system (22) comprises a circular plate-type conveying belt (221) and a pick-up side branch rail (232); and the pick-up side branch rail (232) is arranged in parallel to a major circular rail of the unmanned, rapid and full-plane or local-interchange circular transportation system (2) for passengers' luggage.

5. The system according to claim 1, wherein the luggage transportation rail system (23) comprises a registration side branch rail (231), a pick-up side branch rail (232), a annular connecting rail (233), a passenger plane-side branch rail (234), and the spurs and a control device, the position sensors, and the surveillance cameras therefor; and the rails of the transportation rail system (23) are substantially level with the ground, except for a interchange part, which does not affect the traveling of wheeled vehicles.

6. The system according to claim 1, wherein the passenger plane-side luggage loading and unloading system (24) comprises a luggage loading and unloading truck (241) with a liftable conveying belt, and a passenger plane-side branch rail (234); and the passenger plane-side branch rail (234) is arranged perpendicularly to a major circular rail of the unmanned, rapid and full-plane or local-interchange circular transportation system (2) for passengers' luggage.

7. The system according to claim 1, wherein the powered vehicle group (25) for luggage transportation comprises a plurality of self-powered luggage transportation vehicles each having a position sensor board allowing the control system to sense a position thereof, an electronic control system and a wireless communication module system.

8. The system according to claim 1, wherein the unmanned, rapid and vertical circular transportation system (1) for passengers and the unmanned, rapid and plane or local-interchange circular transportation system (2) for passengers' luggage are uniformly controlled by the real-time sensing display system comprising the position sensors and surveillance cameras that are distributed throughout the double-deck passenger transportation rail system and the luggage transportation rail system, the holographic real-time simulation animation control system, and the DCS comprising the system with the function of automatically grouping all rail network spurs; and the control system must receive a feedback signal acknowledgment before performing next step of a program; and If there is no feedback signal acknowledgment signal, the control system stops performing the program and generates corresponding fault code, which is convenient for a maintenance personnel to carry out rapid trouble clearing and recover operation of the unmanned, rapid and vertical circular transportation system.

\* \* \* \* \*